(12) United States Patent
Nakamura et al.

(10) Patent No.: US 9,910,698 B2
(45) Date of Patent: Mar. 6, 2018

(54) INFORMATION PROCESSING APPARATUS, INFORMATION PROCESSING METHOD, AND PROGRAM

(71) Applicant: Sony Corporation, Tokyo (JP)

(72) Inventors: Yuuichi Nakamura, Tokyo (JP); Takashi Nitta, Saitama (JP); Sadakazu Nagao, Tokyo (JP); Takahiro Okayama, Tokyo (JP); Daisuke Nakata, Kanagawa (JP); Tomoki Uehara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/394,527

(22) PCT Filed: May 23, 2013

(86) PCT No.: PCT/JP2013/003296
§ 371 (c)(1),
(2) Date: Oct. 15, 2014

(87) PCT Pub. No.: WO2013/179621
PCT Pub. Date: Dec. 5, 2013

(65) Prior Publication Data
US 2015/0095915 A1    Apr. 2, 2015

(30) Foreign Application Priority Data

Jun. 1, 2012    (JP) .................................. 2012-125920

(51) Int. Cl.
*G06F 9/46*    (2006.01)
*G06F 9/48*    (2006.01)

(52) U.S. Cl.
CPC .............. *G06F 9/4806* (2013.01); *G06F 9/46* (2013.01); *G06F 9/485* (2013.01); *G06F 9/4843* (2013.01)

(58) Field of Classification Search
None
See application file for complete search history.

(56) References Cited

U.S. PATENT DOCUMENTS

2006/0129600 A1*  6/2006  Ode ...................... G06F 9/4843
2008/0072237 A1*  3/2008  Hellman ............... G06F 3/0219
                                                           719/310

(Continued)

FOREIGN PATENT DOCUMENTS

EP          2381363 A2    10/2011
JP          2008-210398    9/2008

(Continued)

OTHER PUBLICATIONS

Dec. 3, 2015, Japanese Office Action for related JP Application No. 2012-125920.

(Continued)

*Primary Examiner* — Lewis A Bullock, Jr.
*Assistant Examiner* — Mark Gooray
(74) *Attorney, Agent, or Firm* — Paratus Law Group, PLLC

(57) ABSTRACT

There is provided an information processing apparatus including a plurality of application frameworks upon which applications are executed, and a decision unit configured to control a switching of operable states of the plurality of application frameworks.

22 Claims, 19 Drawing Sheets

(56) References Cited

U.S. PATENT DOCUMENTS

| | | | | |
|---|---|---|---|---|
| 2009/0024562 A1* | 1/2009 | Lee | ............... | G06F 8/4434 |
| 2010/0162229 A1* | 6/2010 | Tsuk | ............... | G06F 9/44526 |
| | | | | 717/175 |
| 2011/0131179 A1* | 6/2011 | Ohata | ............... | G06F 9/468 |
| | | | | 707/609 |
| 2014/0053116 A1* | 2/2014 | Smith | ............... | G06F 9/4443 |
| | | | | 715/863 |

FOREIGN PATENT DOCUMENTS

| | | |
|---|---|---|
| JP | 2010-108370 | 5/2010 |
| JP | 2011-242893 | 12/2011 |

OTHER PUBLICATIONS

Sep. 26, 2017, EP communication issued for related EP application No. 13730946.4.

* cited by examiner

[Fig. 3]

[Fig. 4]
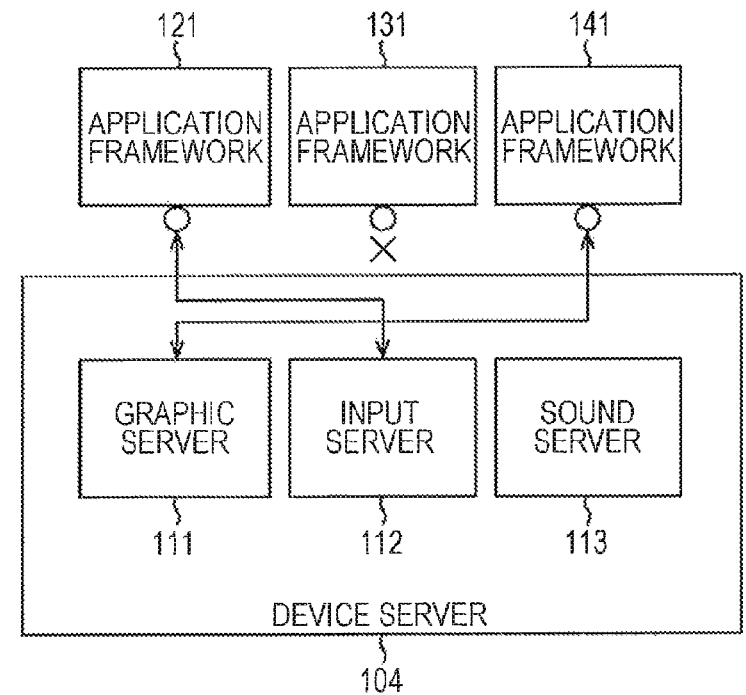
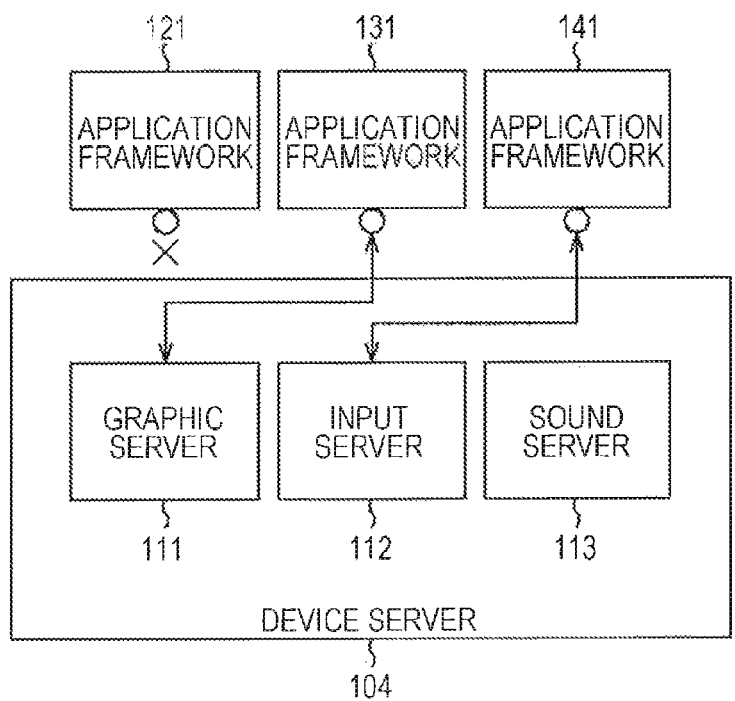

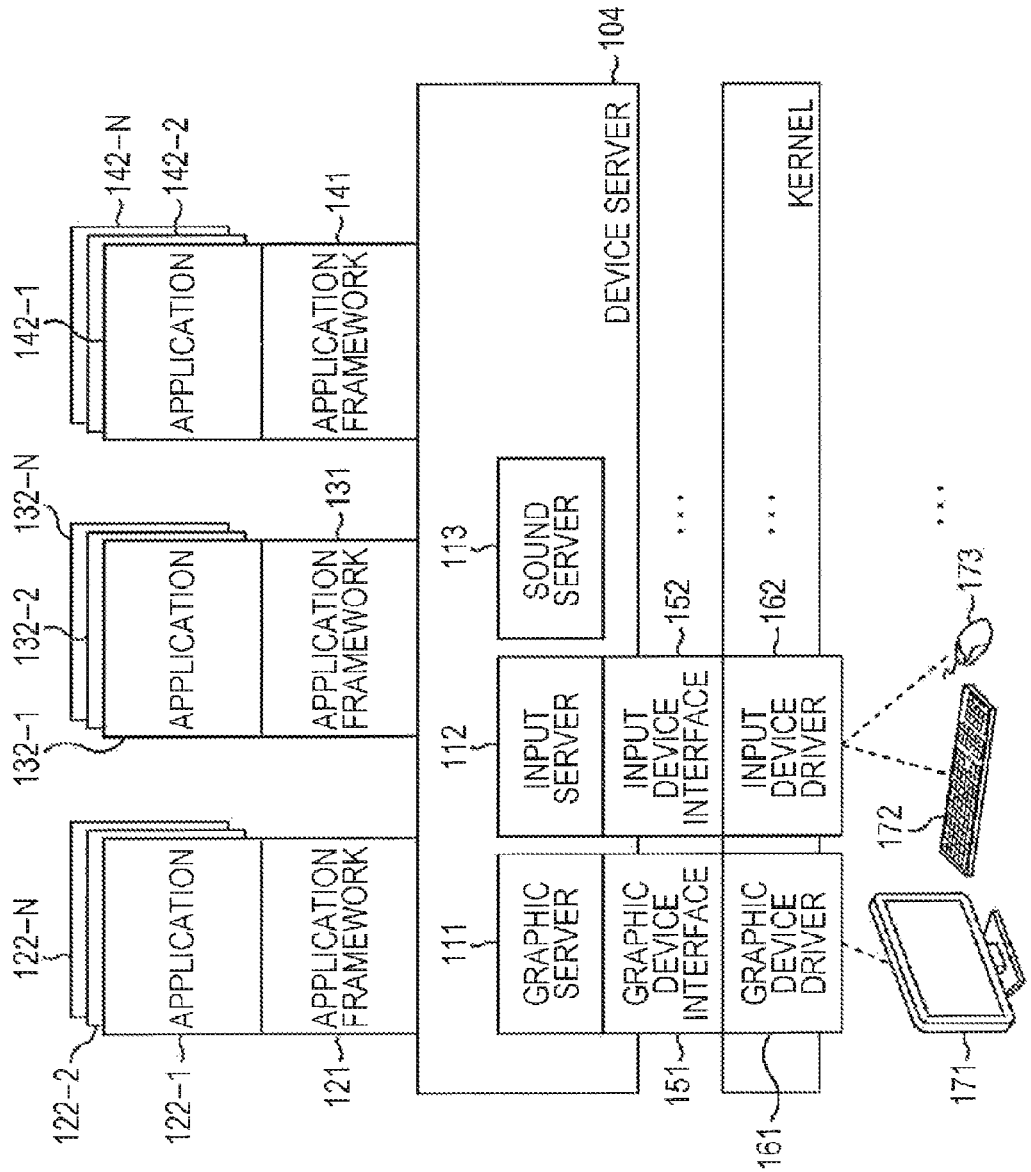
[Fig. 5]

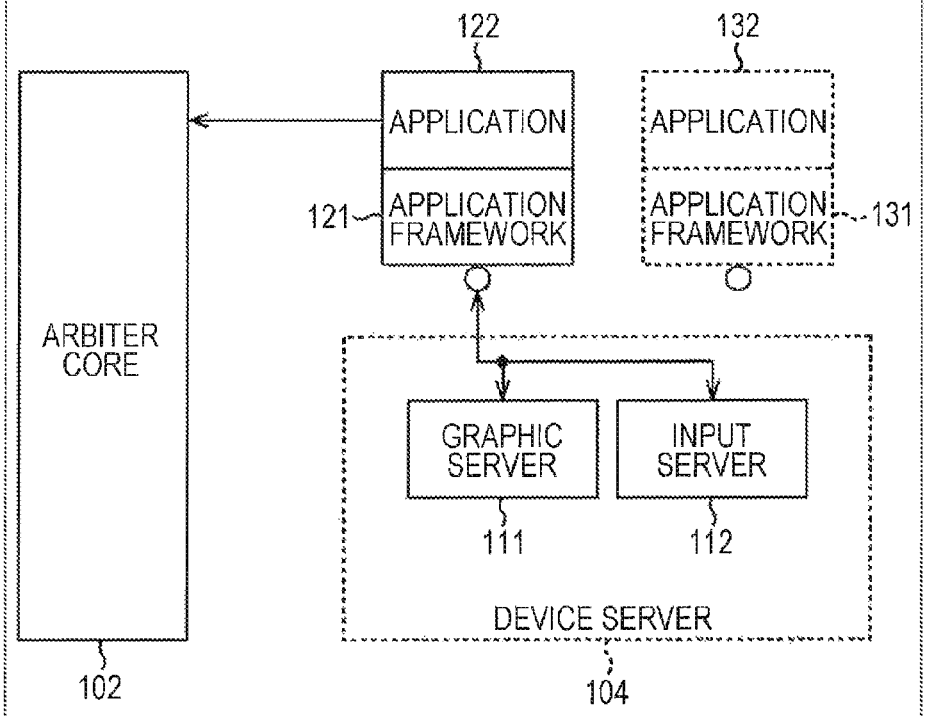
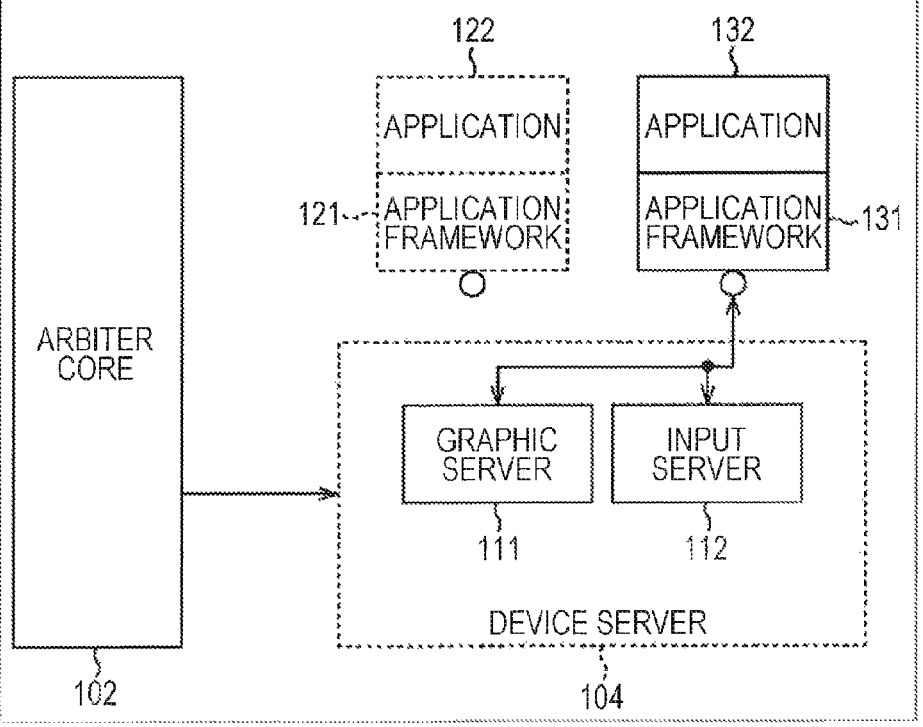

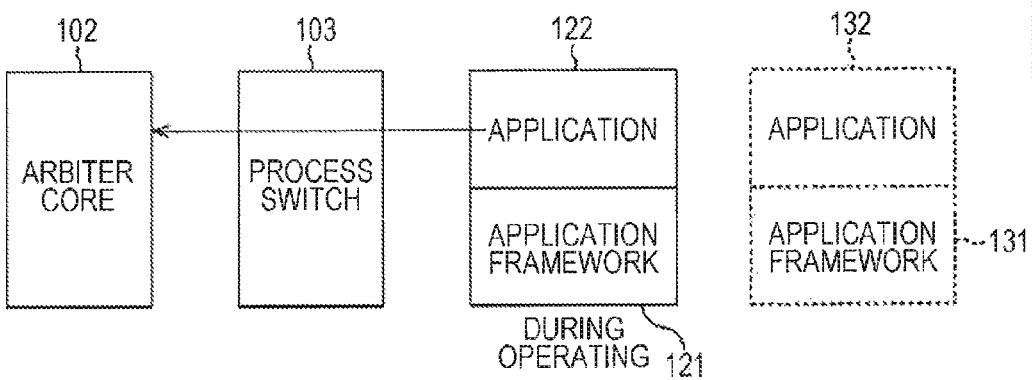
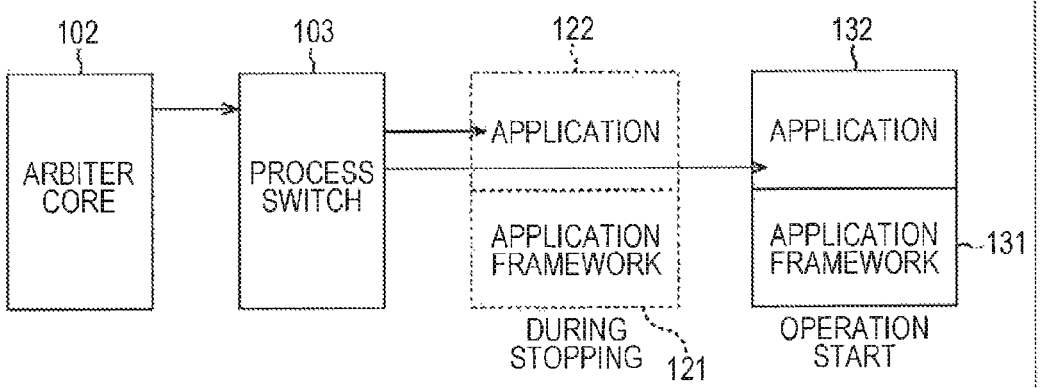

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2013/003296 (filed on May 23, 2013) under 35 U.S.C. § 371, which claims priority to Japanese Patent Application No. 2012-125920 (filed on Jun. 1, 2012), which are all hereby incorporated by reference in their entirety.

TECHNICAL FIELD

The present disclosure relates to an information processing apparatus, an information processing method and a program. Specifically, the present disclosure relates to an information processing apparatus, an information processing method and a program which are capable of performing a process to switch a plurality of application frameworks.

BACKGROUND ART

An application framework is a middleware group that provides a useful function for developing an application. The application framework is designed on the premise that one application framework is present on one system so as to operate. Accordingly, if a user wants to use a plurality of application frameworks in one system, there are necessities for switching application frameworks by using methods such as a method in which once the power of an apparatus is off, the application framework can be changed when the power thereof is turned on again, a method in which a separate processor and hardware are provided to switch the processor and the hardware, or a method in which a virtual machine is used.

PTL 1 discloses an electronic apparatus having a high extensibility in managing changes in exclusion control settings of a device using the transition of applications, which are executing, as a unit, in order to solve the difficulty when extending a system.

CITATION LIST

Patent Literature

PTL 1: Japanese Unexamined Patent Application Publication No. 2008-210398

SUMMARY OF INVENTION

Technical Problem

In a case where one application framework is present on one system and an application is allowed to operate on this application framework, it is necessary to design the application to fit into the application framework. Therefore, depending on an application, it may be difficult to design to fit into an application framework. Accordingly, time and cost in terms of developing an application and a checking of operation increases.

It is desirable to enable a use of a plurality of applications which operate on each application framework, by switching a plurality of application frameworks.

Solution to Problem

An information processing apparatus according to an embodiment of the present disclosure includes a plurality of application frameworks upon which applications are executed, and a decision unit configured to control a switching of operable states of the plurality of application frameworks.

An information processing method according to another embodiment of the present disclosure includes executing a first application associated with a first application framework, switching an operating state of a second application framework to become active, and executing a second application associated with the second application framework after the operating state of the second application framework is switched to become active.

According to another embodiment of the present disclosure, there is provided a non-transitory computer-readable medium embodied with a program, which when executed by a computer, causes the computer to perform a method including executing a first application associated with a first application framework, switching an operating state of a second application framework to become active, and executing a second application associated with the second application framework after the operating state of the second application framework is switched to become active.

An information processing apparatus according to an embodiment of the present disclosure includes a plurality of application frameworks and a switching unit that switches the application frameworks.

An information processing apparatus according to an embodiment of the present disclosure may further include a first application framework among the plurality of application frameworks, a first application that operates on the first application framework, a second application framework that is different from the first application framework, and a second application that operates on the second application framework. The switching unit may switch input and output destinations of a device from the first application framework to the second application framework, when switching from the first application to the second application framework is instructed.

The switching unit may perform switching to connect the plurality of application frameworks and the device one-on-one.

The switching unit may respectively have a portion that carries out a function of deactivating a predetermined application among the applications and activating other application, and a portion that carries out a function of separating the predetermined application among the plurality of application frameworks from the device and connecting the predetermined application to other application framework.

The switching unit may deactivate the first application and activate the second application, when the switching from the first application to the second application framework is instructed.

The first application may be in a plurality, and the switching unit may be present as one application of a plurality of first applications, and the switching unit as the first application may transmit input from the device to the second application framework.

The switching unit may be present as one function of the first application framework, and the switching unit that is included in the first application framework may transmit input from the device to the second application framework.

Input from the device may be supplied from the first application or the first application framework to the second application framework, by an input supplying function included in an operating system.

The input supplying function may be a function of uinput.

Output data from the second application may be stored in a storage unit through the second application framework, and the output data stored in the storage unit may be read by the first application and then supplied to the device through the first application framework.

Drawing data, which the second application draws, may be stored in the storage unit through the second application, and the drawing data stored in the storage unit is read by the first application and then supplied to a display through the first application framework.

The first application framework may be an application framework related to a camera function, and the second application framework may be an application framework related to a communication function.

An image, which is captured according to an input operation from a user by a process of the first application operating on the first application framework related to the camera function, may be sent to other device by a process of the second application operating on the second application framework related to the communication function.

According to another embodiment of the present disclosure, an information processing method of an information processing apparatus, which includes a plurality of application frameworks, includes switching the application frameworks.

According to still another embodiment of the present disclosure, a program causes a computer, which controls an information processing apparatus including a plurality of application frameworks, to execute a process of switching the application frameworks.

In the information processing apparatus, the information processing method and a program according to embodiments of the present disclosure, a plurality of application frameworks are provided and the plurality of application frameworks are selectively switched.

Advantageous Effects of Invention

According to an embodiment of the present disclosure, it is possible to switch a plurality of application frameworks. Moreover, by switching the plurality of application frameworks, it is possible to use a plurality of applications which operate on each application framework.

BRIEF DESCRIPTION OF DRAWINGS

FIG. 4 is a diagram illustrating the connection of application frameworks, in accordance with embodiments.

FIG. 5 is a diagram illustrating a configuration related to application frameworks, in accordance with embodiments.

FIG. 6 is a diagram illustrating the switching of application frameworks, in accordance with embodiments.

FIG. 7 is a diagram illustrating the switching of application frameworks, in accordance with embodiments.

DESCRIPTION OF EMBODIMENTS

Hereinafter, embodiments for carrying out the present disclosure will be described. In addition, the description will be made as follows.

1. Information Processing Apparatus Configuration
2. Software Stack
3. Switching of a Plurality of Application Frameworks
4. Exclusion Control
5. Interface
6. Switching Process of Application Frameworks by Arbiter Core
7. Switching of Applications
8. Arbiter Configuration
9. Processes at Time of Activation
10. Switching Process of Application Frameworks
11. Processes related to Inputting after Switching of Application Frameworks
12. Other Processes related to Inputting
13. Processes related to Outputting
14. Recording Medium <Information Processing Apparatus Configuration>

Figure 1:
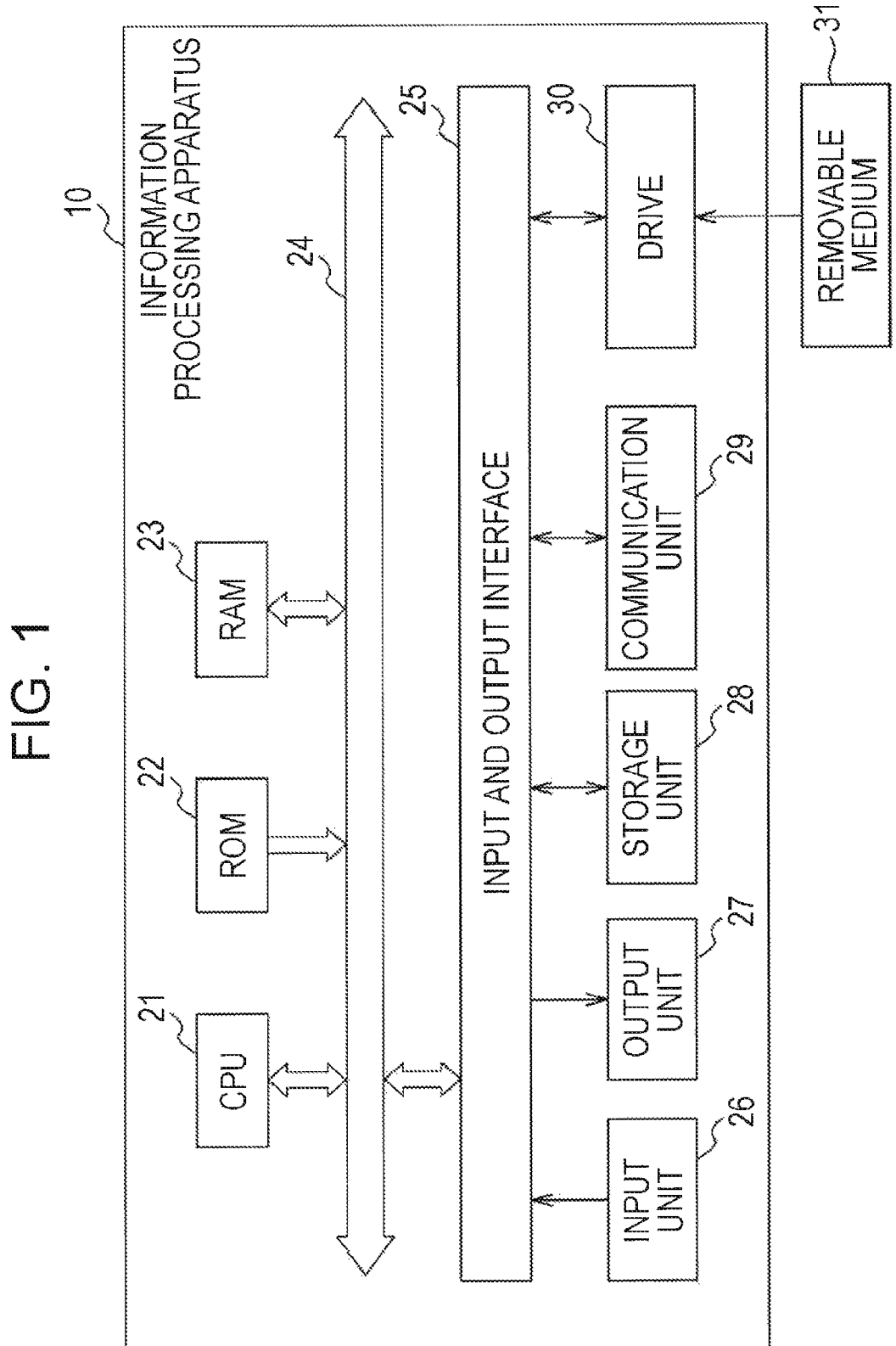
FIG. 1 is a diagram illustrating a configuration of an information processing apparatus, in accordance with embodiments.

FIG. 1 is a diagram illustrating a configuration of an information processing apparatus, in accordance with embodiments. Herein, an information processing apparatus 10 will be described as an example, and the information processing apparatus 10 may be, for example, a personal computer. Moreover, the information processing apparatus 10 may be an apparatus that configures a portion of an imaging apparatus such as a digital camera or a reproducing apparatus such as a television set and may be built therein.

A CPU (Central Processing Unit) 21 receives a signal, which corresponds to various instructions inputted by a user of the information processing apparatus 10 using an input unit 26, through an input and output interface 25 and an internal bus 24, and then executes various processes based on the inputted signal.

A ROM (Read Only Memory) 22 basically stores fixed data among programs and parameters for computation used by the CPU 21. A RAM (Random Access Memory) 23 stores programs or data used in execution of the CPU 21 and parameters that change as necessary in the execution thereof. The CPU 21, the ROM 22 and the RAM 23 are interconnected through the internal bus 24.

The internal bus 24 is also coupled to the input and output interface 25. The input unit 26 may include, for example, a keyboard, a touch pad, a jog dial, a pen tablet or a mouse and is operated when the user of the information processing apparatus 10 inputs various instructions to the CPU 21. An output unit 27 may include, for example, a display such as a liquid crystal display unit and displays various kind of information in the form of text or an image.

A storage unit 28 may include a storage device such as a HDD (hard disk drive) and records or reproduces a program executed by the CPU 21 or information. A communication unit 29 is coupled to other devices through wired or wireless communication, and receives and transmits information. A removable medium 31 such as a magnetic disk, an optical disc, a magneto-optical disk, or a semiconductor memory is mounted on a drive 30, as necessary, and data is received and transmitted.

The components of the input unit 26 to the drive 30 are coupled to the CPU 21 through the input and output interface 25 and the internal bus 24.

<Software Stack>

Next, the operation environment of an embodiment will be described. A software stack in a software program in accordance with embodiments, which is executed by the CPU 21 of the information processing apparatus 10 described by using FIG. 1, will be described by using FIG. 2. In the drawing, a module as shown in the upper portion of the drawing is considered as the upper level relative to a module as shown in the lower portion thereof.

Figure 2:
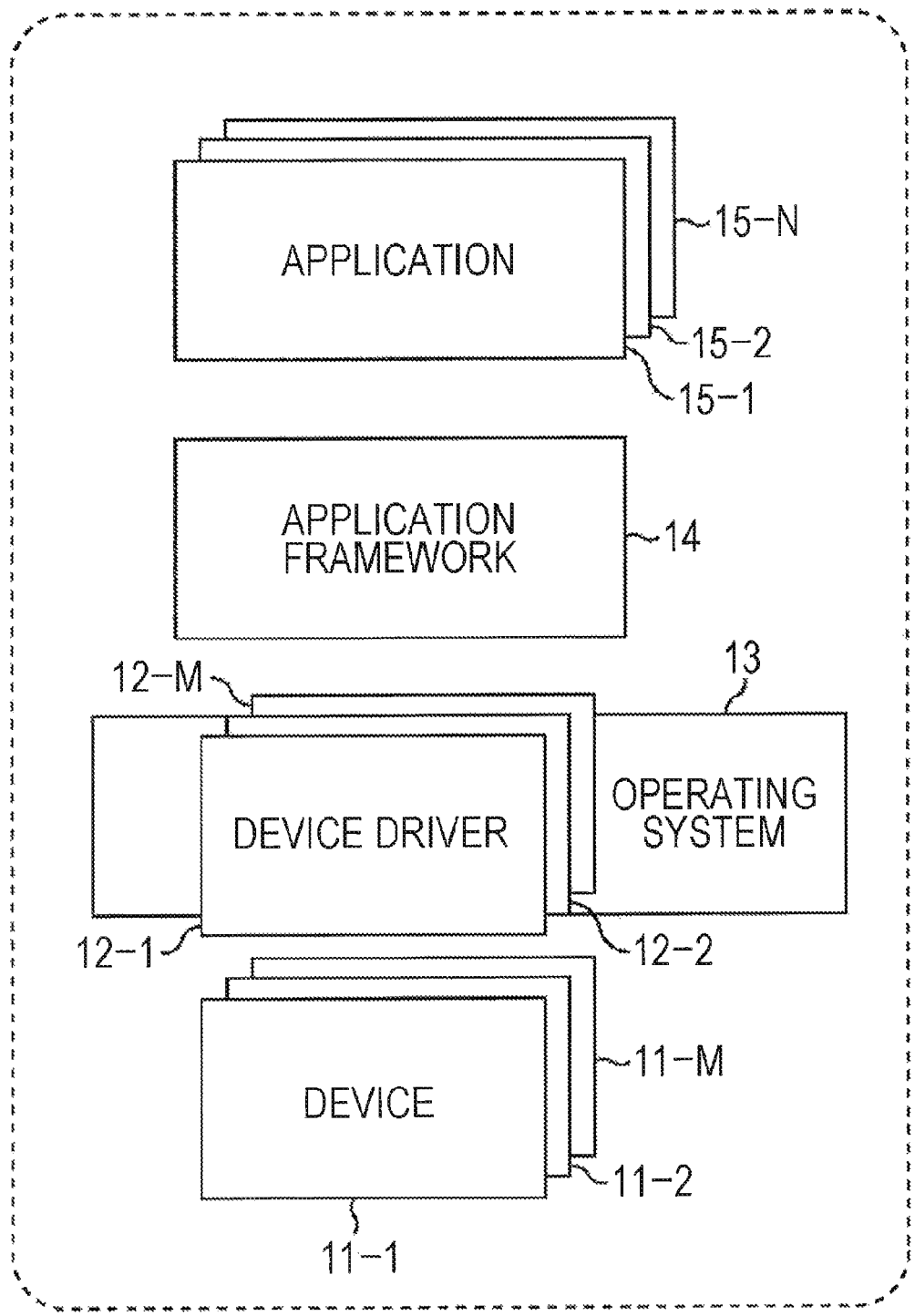
FIG. 2 is a diagram illustrating an application framework, in accordance with embodiments.

The software stack illustrated in FIG. 2 includes devices 11-1 to 11-M, device drivers 12-1 to 12-M, an operating system 13, an application framework 14, and applications 15-1 to 15-N.

The devices 11-1 to 11-M may be, for example, hardware such as a keyboard or a mouse configuring the input unit 26, and a display configuring the output unit 27. The device drivers 12-1 to 12-M are software necessary for operating the devices 11-1 to 11-M. Herein, it is considered that the device drivers 12-1 to 12-M are supplied with the operating system 13 and then the description thereof will be continued to be described. Moreover, if it is not necessary to individually differentiate the devices 11-1 to 11-M or the device drivers 12-1 to 12-M, and they can simply be described as the device 11 and the device driver 12.

The operating system 13 may be, for example, a software which provides a basic function to be commonly used in various applications 15 and then manages the entire computer system, such as the management of the device driver 12, which is a software to operate peripheral devices such as a mouse, a keyboard and a display configuring the input unit 26 and the output unit 27, or the management of the storage unit 28, which stores various information.

The application framework 14 may be a collection of classes or libraries which is used to implement the standard structure of an application for a specific operating system, in programming. Since a code, which is commonly necessary for each kind of platform or application, is provided in the application framework 14, in advance, when developing an application, a target application may be developed by only integrating and implementing a unique function in a framework.

As illustrated in FIG. 2, in one system in accordance with embodiments, one application framework 14 is present and the applications 15-1 to 15-N, which are fitted into the application framework 14, are present. The application framework 14 encapsulates the device 11 and abstracts the device with respect to the application 15, and generally, only one application framework 14 is installed on one system.

If the application 15 is suitable for the application framework 14, the development is performed to be fitted into the application framework 14, thereby reducing time and cost. On the other hand, this indicates that, when developing an application, it is not possible to develop a target application without integrating and implementing a unique function in a framework. Moreover, according at least to this, if the application 15 is not suitable for the application framework 14, there is a possibility that a waste of time and cost is caused by performing the development to be fitted into the application framework 14.

To address this and other circumstances, a plurality of application frameworks 14 may be provided in one system and the application 15 suitable for each application framework 14 is developed so as to be implemented. Therefore, a new application (e.g., function) or the like is easily added. By switching the plurality of application frameworks 14, a plurality of applications 15, which are positioned on the application frameworks 14, may be selectively used, thereby being helpful to fulfill a function or the like.

Hereinafter, description will be given of a case of a software stack configuration in a case where a plurality of application frameworks 14 are installed in one system, the plurality of application frameworks 14 are selectively switched, and then the application 15 positioned on the switched application framework 14 may be used.

Switching of Plurality of Application Frameworks>

Figure 3:
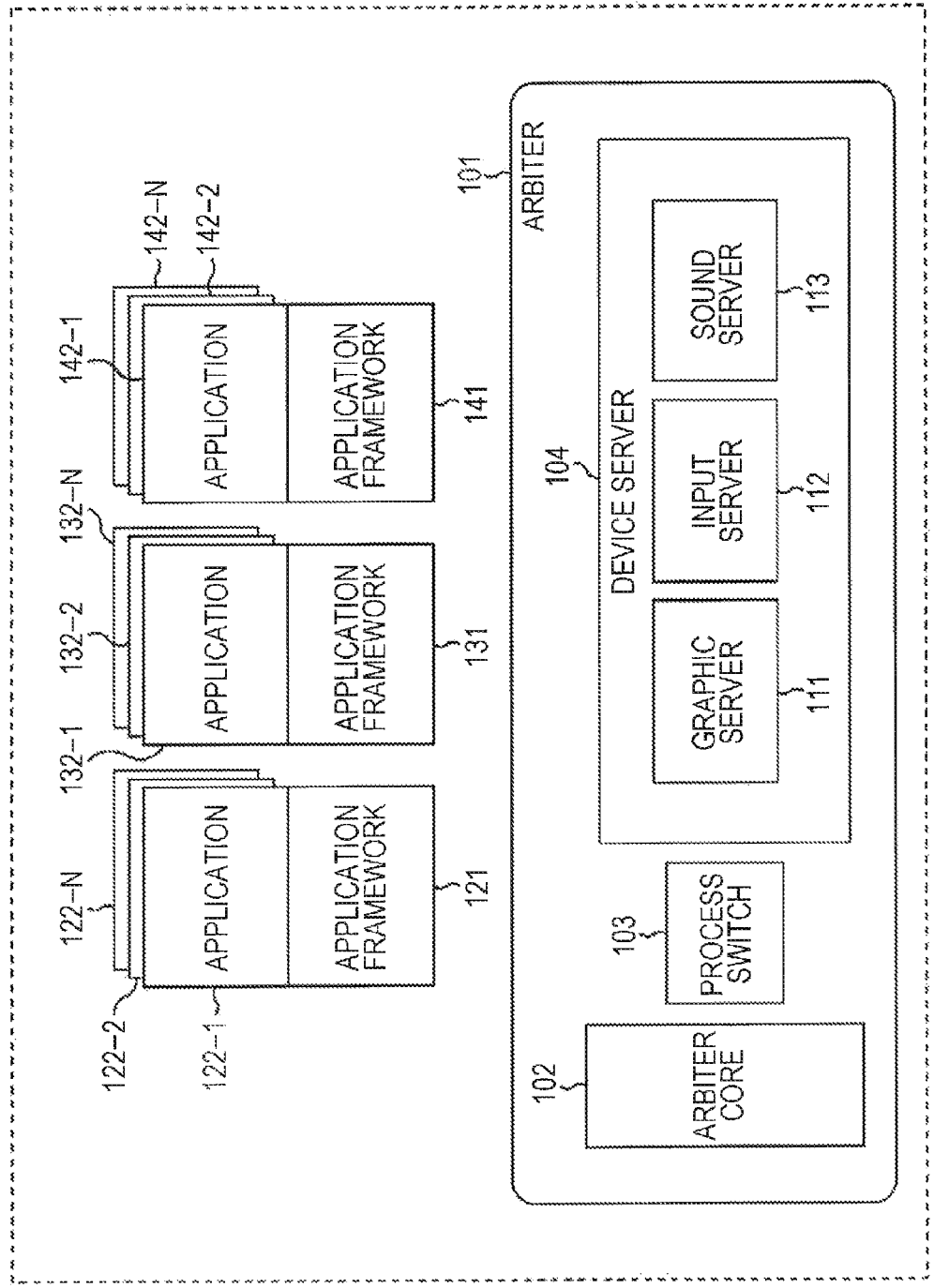
FIG. 3 is a diagram illustrating application frameworks, in accordance with embodiments.

FIG. 3 is a diagram illustrating a software stack configuration in a case where the plurality of application frameworks 14 are installed in one system, in accordance with embodiments. In the software stack illustrated in FIG. 3, an arbiter 101, an application framework 121, applications 122-1 to 122-N, an application framework 131, applications 132-1 to 132-N, an application framework 141, and applications 142-1 to 142-N are installed.

The arbiter 101 includes an arbiter core 102, a process switch 103, and a device server 104. The device server 104 manages a plurality of device drivers and, in an example illustrated in FIG. 3, manages a graphic server 111, an input server 112, a sound server 113, or the like.

In addition, in the configuration illustrated in FIG. 3, illustration of the device 11 and the operating system 13 illustrated in FIG. 2 is omitted.

The applications 122-1 to 122-N are applications which are fitted into the application framework 121. Similarly, the applications 132-1 to 132-N are applications which are fitted into the application framework 131, and the applications 142-1 to 142-N are applications which are fitted into the application framework 141.

Further, herein, the number of the application 122, the application 132, and the application 142 is respectively set to N in the drawing, but the number thereof may be different, respectively. Furthermore, in FIG. 3, three application frameworks of the application framework 121, the application framework 131, and the application framework 141 are shown and the following description will be continued to be described. However, this description does not indicate that the number thereof is limited to three, and needless to say, the number thereof may be any number.

As illustrated in FIG. 3, when the application frameworks 121, 131 and 141 are allowed to exist together, the applications 122, 132 and 142, which are dependent on its own application framework, may operate in one system. In addition, in order to realize this, the arbiter 101 may be provided. In the following description, in a case where any of application frameworks 121, 131 and 141 is set to a target, the application frameworks 121, 131 and 141 are described as an application framework. Moreover, in a case where any of applications 122-1 to 122-N, 132-1 to 132-N and 142-1 to 142-N is set to a target, the applications 122-1 to 122-N, 132-1 to 132-N and 142-1 to 142-N are described as an application.

The application framework 121 is, for example, a framework which is specialized in a camera function, in order to operate a camera application existing before. For example, the camera function may indicate functions of imaging or reproducing a still image, imaging or reproducing a moving image, zooming, auto-focusing or the like.

The application framework 121 may be a framework which is specialized in the camera function described above, and provided with a function necessary for developing a digital camera application. The application 122 is an application which is specialized in the function of the application framework 121 and may be an application to realize the camera function.

However, for example, the application framework 121 may not have a communication function to communicate over a network, but an application framework 131 different from the application framework 121 may have such a communication function. Herein, it is considered that the application framework 131 has a function to communicate over the network.

The application framework 131 may be an application framework in which a communication function used in smartphones is fulfilled, and has functions of browsing a homepage on the Internet, uploading to Cloud, or the like.

The application 132 on the application framework 131 may be set to an application to upload a captured image to the network, and the application 132 described above is developed by using the application framework 131 with relative ease.

Since the application framework 121 has a function related to imaging by using a digital camera, or the like, it is not necessary for the application framework 131 to have the function related to a camera function as described above. Therefore, it is possible to make the application framework 131 dedicated to a network function.

The above-described application frameworks having different functions to each other are subjected to switching from one application framework, which is operating on a system at a certain moment, to the other application framework. For example, at a certain moment, the application framework 121 is available and, during the certain moment, the application 122 using the application framework 121 is in an operable state (e.g., is operating). Moreover, at other certain moments, the application framework 131 is in an operable state. This switching of application frameworks may be controlled by the arbiter 101. This switching may be performed by an instruction from an application.

In embodiments, the arbiter core 102 of the arbiter 101 determines which application framework is made available, based on the instruction from the application that is activated. The arbiter core 102 thereof controls switching to the application framework based on the determination, and switching to the application that operates on the switched application framework.

The arbiter core 102 performs the series of processes such as a process of instructing the application framework in operation to pause, a process of instructing the application framework, which is made available, to start, and a process of informing the device server 104 of the application framework which uses system resources.

With respect to a device that each application framework uses, the device server 104 performs an exclusion process of which system is coupled to the device, depending on a switching request. The exclusion process will be described with reference to FIG. 4. In addition, as described with reference to FIG. 5, the device server 104 has a role in an interface between the application framework and the system resources (e.g., a device of hardware or the like).

Further, the device server 104 has information regarding which application framework is currently available and has functions such as a function of distributing information of an input device to the application framework, which is currently available, and a function of outputting information only from the application framework, which is currently available, as information of an output device.

Furthermore, as described with reference to FIG. 6, in the arbiter 101, the arbiter core 102 may also be a module that calls the process switch 103 and the device server 104 and switches the application frameworks, based on the request from the application.

As described with reference to FIG. 7, the process switch 103 may be a module that activates or deactivates a process to execute an application of each application framework and switches the execution object of the application.

Herein, it is assumed that the arbiter 101 is provided with the arbiter core 102, the process switch 103 and the device server 104 and the description thereof will be continued to be described. However, the arbiter 101 may control to selectively switch the plurality of application frameworks, and the configuration of the arbiter 101 is not limited to the configuration in which each of the arbiter core 102, the process switch 103 and the device server 104 is independently provided, as illustrated in FIG. 3.

<Exclusion Control>

First, with reference to FIG. 4, the exclusion process that is performed by the device server 104 and that which system is coupled to a device in accordance with the switching request will be described, in accordance with embodiments. With regard to the device, such as a keyboard, since one device is generally present in a system, it is not possible for two application frameworks to use the device at the same time. Therefore, it is necessary to perform the exclusion process in which one application framework is coupled to one device such that two or more application frameworks do not use one device at the same time.

As illustrated in FIG. 4A, it is assumed that the application framework 121 may be coupled to the input server 112 and the application framework 141 may be coupled to the graphic server 111.

Moreover, when the application framework 121 is considered as a client, the graphic server 111 and the input server 112 are named as a server because the graphic server 111 and the input server 112 carry out a role of a server. For example, as described later, the graphic server 111 as a server has an interface function to supply data to a graphic device driver 161, and the application framework 121 as a client may supply data to the graphic device driver 161 by using the function of the graphic server 111.

Since the relationship between a server and a client described above is present, herein, the description "server" is used in a similar way to be referred to as the graphic server 111 and the input server 112.

In a state as illustrated in FIG. 4A, the application framework 121 is coupled to the input server 112 one-on-one, and the application framework 141 is coupled to the graphic server 111 one-on-one. Therefore, the exclusion control is normally performed.

Similarly, as illustrated in FIG. 4B, it may be assumed that the application framework 131 is coupled to the graphic server 111 and the application framework 141 may be coupled to the input server 112. In this case, the application framework 131 is coupled to the graphic server 111 one-on-one, and the application framework 141 is coupled to the input server 112 one-on-one. Therefore, the exclusion control is normally performed.

In such a manner, the device server 104 performs the exclusion control such that an application framework is coupled to a device server in the device server 104 one-on-one.

<Interface>

Next, the interface between the application framework and the system resources, in accordance with embodiments, will be described with reference to FIG. 5. As illustrated in FIG. 5, exchanging data is mediated by a graphic device interface 151 between the graphic server 111 in the device server 104 and a graphic device driver 161. The graphic device driver 161 is a driver that controls the output data to a display 171.

Exchanging data is mediated by an input device interface 152 between the input server 112 in the device server 104 and an input device driver 162. The input device driver 162 is a driver that controls input from a keyboard 172 or a mouse 173. Although not shown in the drawing, the sound server 113 exchanges data with a driver through an interface.

The application framework uses the graphic server 111 and the input server 112 in the device server 104 for the interfaces of the graphic device driver 161 and the input device driver 162. That is, it is considered that the device server 104 has an interface function, and thus the device server 104 has a function to correspond a driver to an application framework.

<Switching Process of Application Framework by Arbiter Core>

Next, the switching, in accordance with embodiments, of application frameworks by the arbiter core 102 will be described with reference to FIGS. 6A and 6B. FIG. 6A illustrates a connection state at a certain time. The application framework 121 is coupled the graphic server 111, and the application framework 121 is coupled to the input server 112. In this state, the switching from the application 122 to the application framework 131 is instructed to the arbiter core 102.

At a next time frame, the arbiter core 102, which receives the above-described instruction, issues the instruction for switching to the application framework 131, to the device server 104. When the device server 104 receives the instruction from the arbiter core 102, the device server 104 switches the connection destinations of the graphic server 111 and the input server 112 from the application framework 121 to the application framework 131 based on the instruction, as illustrated in FIG. 6B.

In such a manner, the arbiter core 102 issues the instruction for switching application frameworks to the device server 104, depending on the instruction from the application. The device server 104 performs the switching of the application frameworks of the connection destinations, based on the instruction from the arbiter core 102.

<Switching of Applications>

While the switching of application frameworks as described above is performed, it is also necessary to perform the switching of applications such that a process is started by the application of the switched destination. The switching of applications in accordance with embodiments will be described with reference to FIGS. 7A and 7B.

FIG. 7A illustrates a state where the application framework 121 operates and the application 122 on the application framework 121 operates. In this state, the instruction for switching to the application framework 131 is issued from the application 122 to the arbiter core 102.

When the arbiter core 102 receives the instruction from the application 122, the arbiter core 102 issues the instruction for switching to the application 132, to the process switch 103, based on the instruction, as illustrated in FIG. 7B. The process switch 103 recognizes the application that is operating at the time when receiving the instruction from the arbiter core 102, and issues the instruction for stopping the operation to the recognized application. In this case, the process switch 103 issues the instruction for stopping the operation to the application 122. The application 122 stops the operation based on the instruction.

On the other hand, the process switch 103 issues the instruction for starting the operation to the application 132. The application 132 starts the operation based on the instruction.

In such a manner, applications may be switched by the process switch 103. In addition, the instruction for switching applications to the process switch 103 may be issued from the arbiter core 102. As described above, the arbiter core 102 may also issue the instruction for switching the application frameworks of the connection destinations to the device server 104.

In this way, the process switch 103 may switch applications based on the instruction from the arbiter core 102 and the device server 104 may switch application frameworks. Therefore, it is possible to switch application frameworks and to switch the applications, which operates on the application frameworks.

<Arbiter Configuration>

Figure 8:
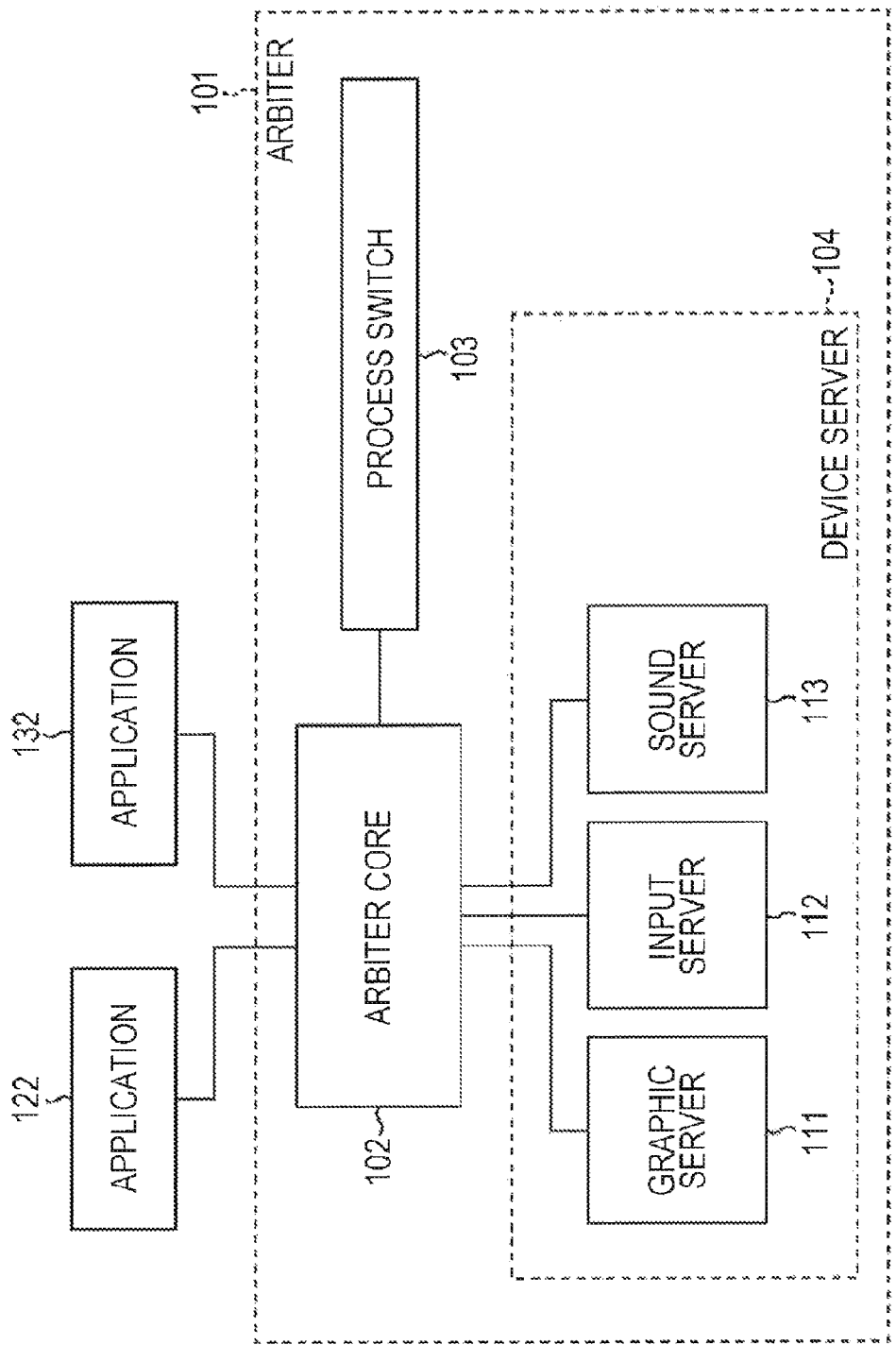
FIG. 8 is a diagram illustrating the switching of application frameworks, in accordance with embodiments.
Figure 9:
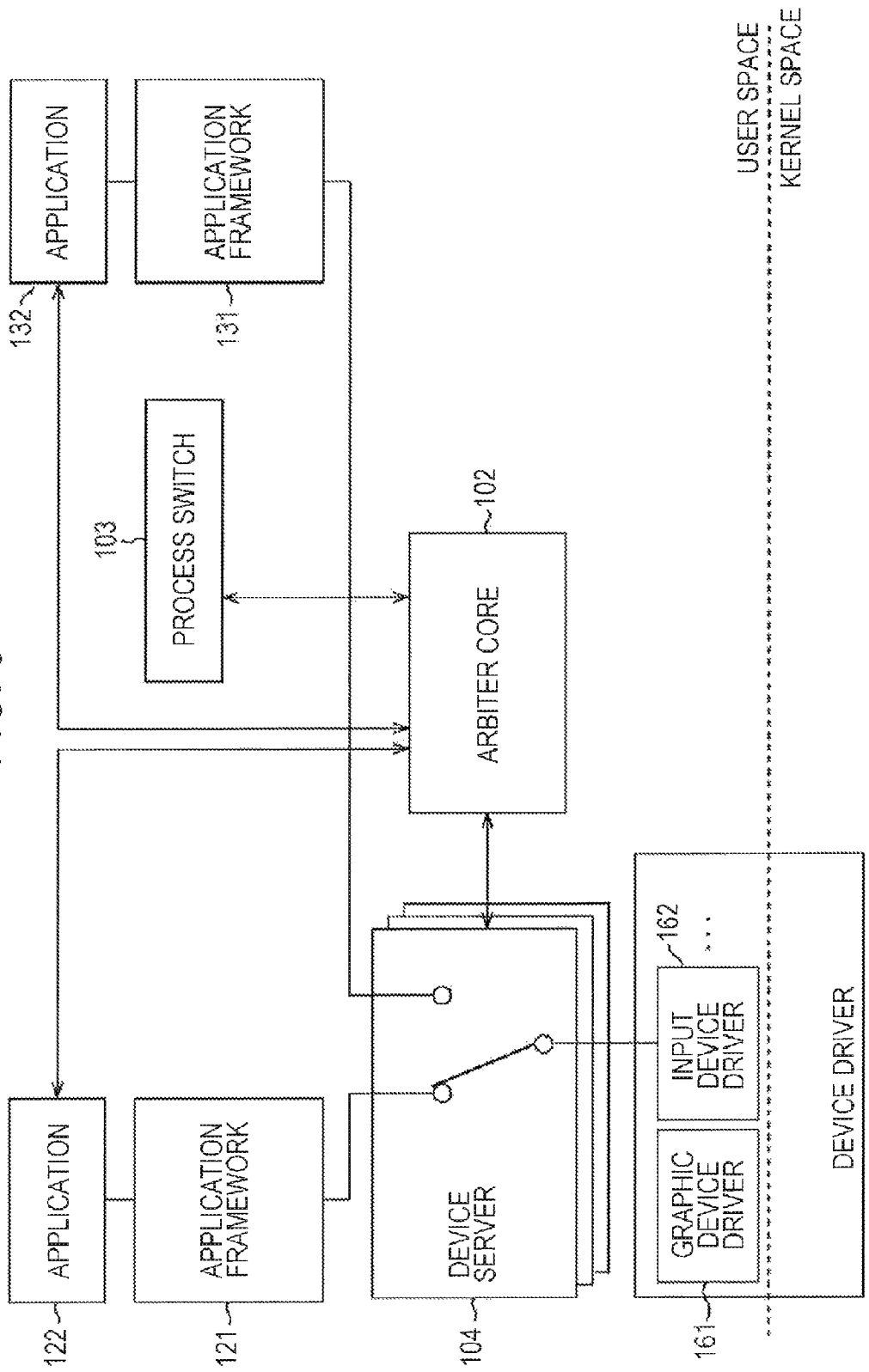
FIG. 9 is a diagram illustrating the switching of application frameworks, in accordance with embodiments.

A configuration of the arbiter 101 and the relationship between the arbiter 101 and other subsystems in accordance with embodiments is illustrated in FIG. 8 and FIG. 9. With reference to FIG. 8 and FIG. 9, the arbiter core 102 of the arbiter 101 receives the instructions from the application 122 and the application 132. In addition, the arbiter core 102 is coupled to the process switch 103 to issue the instruction thereto and is also coupled to each device server in the device server 104.

As illustrated in FIG. 9, the device server 104 in accordance with embodiments is configured to have a switch. In the example illustrated in FIG. 9, a switch, which executes the connection switching between the input device driver 162 and the application framework 121 or the application framework 131, is shown in the drawing. Although not shown in the drawing, a switch or the like, which executes the connection switching between the graphic device driver 161 and the application framework 121 or the application framework 131, is also included in the device server 104.

As described above, the device server 104 may be configured to have a plurality of switches, which switch the connection between each device driver and application frameworks.

<Processes at Time of Activation>

Figure 10:
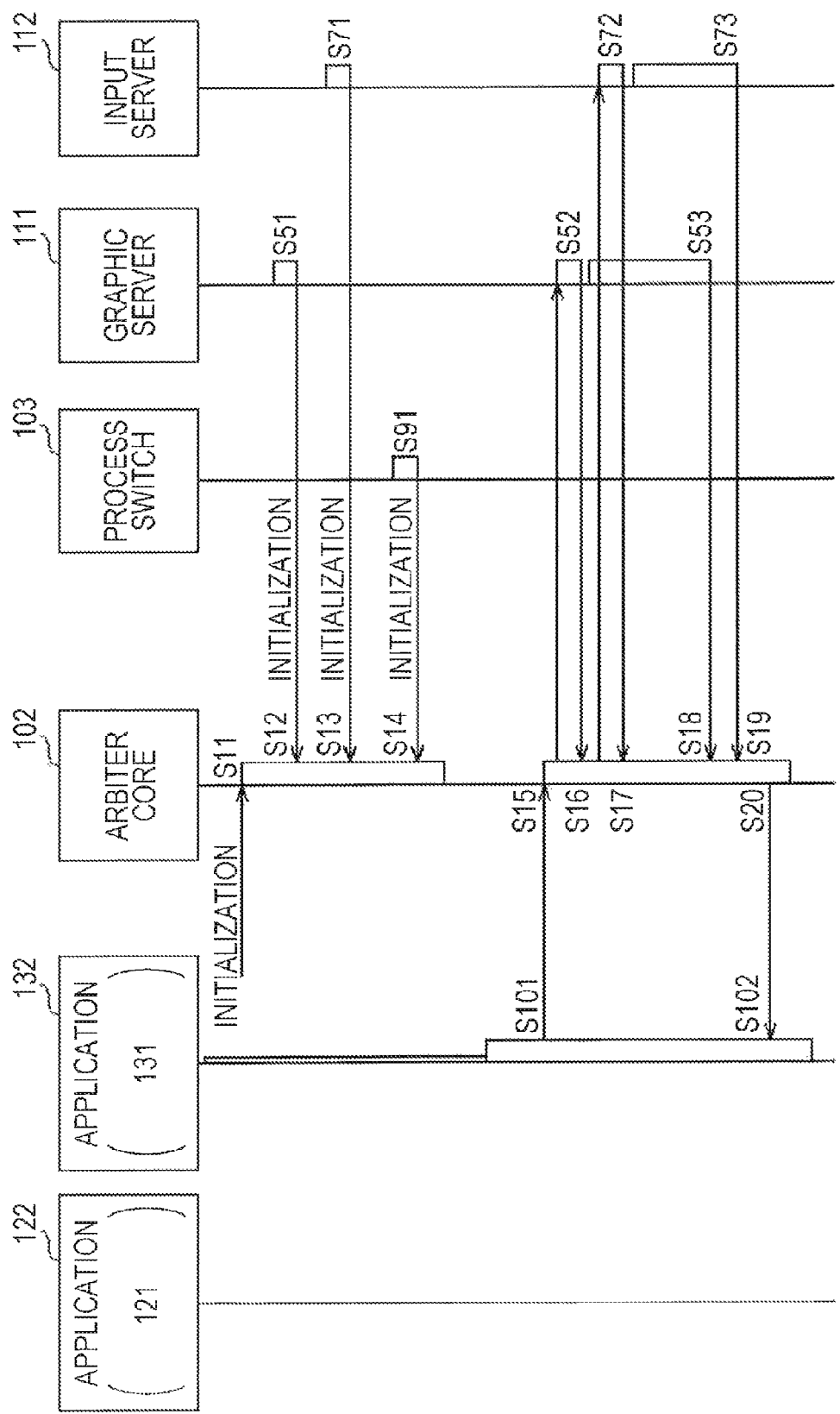
FIG. 10 is a diagram illustrating the switching of application frameworks, in accordance with embodiments.

Next, in accordance with embodiments and with reference to a sequence diagram as illustrated in FIG. 10, processes to be execute at the time of activation will be described in a system (or an apparatus) having a software stack that performs the switching of the application framework described above with reference to FIG. 3 to FIG. 9.

For example, when the power of the information processing apparatus 10 illustrated in FIG. 1 is on, an initialization command is issued to the arbiter core 102 or the like, from the CPU 21. In Step S11, the arbiter core 102 performs an initialization process.

In Step S51, the graphic server 111 also performs an initialization process and, after completion of the initialization, submits a notice of completion of the initialization to the arbiter core 102. The arbiter core 102 receives the notice in Step S12.

In a similar way, in Step S71, the input server 112 also performs an initialization process and, after completion of the initialization, submits a notice of completion of the initialization to the arbiter core 102. The arbiter core 102 receives the notice in Step S13. The processes as described above are executed by each device server in the device server 104. As illustrated in FIG. 10 and described in the following description, the graphic server 111 and the input server 112 in accordance with embodiments will be exemplified and described.

In a similar way, in Step S91, the process switch 103 also performs an initialization process and, after completion of the initialization, submits a notice of completion of the initialization to the arbiter core 102. The arbiter core 102 receives the notice in Step S14. In this way, the arbiter core 102 receives the notice of completion of the initialization and thus recognizes the state of the device servers in the device server 104 and the state of the process switch 103.

Herein, a case where the activation of the application 132 is instructed by the CPU 21 will be exemplified and described. In this case, the application framework 131 and the application 132 are activated. When the application 132 is activated, in Step S101, the connection request with a device is forwarded to the arbiter core 102 from the application 132.

When the arbiter core 102 receives the request from the application 131 in Step S15, a callback process is executed between the arbiter core 102 and the graphic server 111 (Step S16 and Step S52). In addition, a callback process is also executed between the arbiter core 102 and the input server 112 (Step S17 and Step S72).

As described above with reference to FIG. 6 and in accordance with embodiments, by the exclusion control of the device server 104, an application framework and a device server (e.g., specific device) are coupled one-to-one. In this case, the graphic server 111 and the input server 112 are coupled to the application framework 131, respectively. When the connection described above is completed, the notices of completion of the connection are submitted from the graphic server 111 and the input server 112, respectively (Step S53 and Step S73).

The arbiter core 102 receives the notices from the graphic server 111 and the input server 112, in Step S18 and Step S19. In Step S20, a notice of completion of connection with a device is submitted to the application framework 131 (or application 132) and, in Step S102, received by the application 132. When the connection described above is completed, a process performed by the application 132 is started.

<Switching Process of Application Frameworks>

Figure 11:
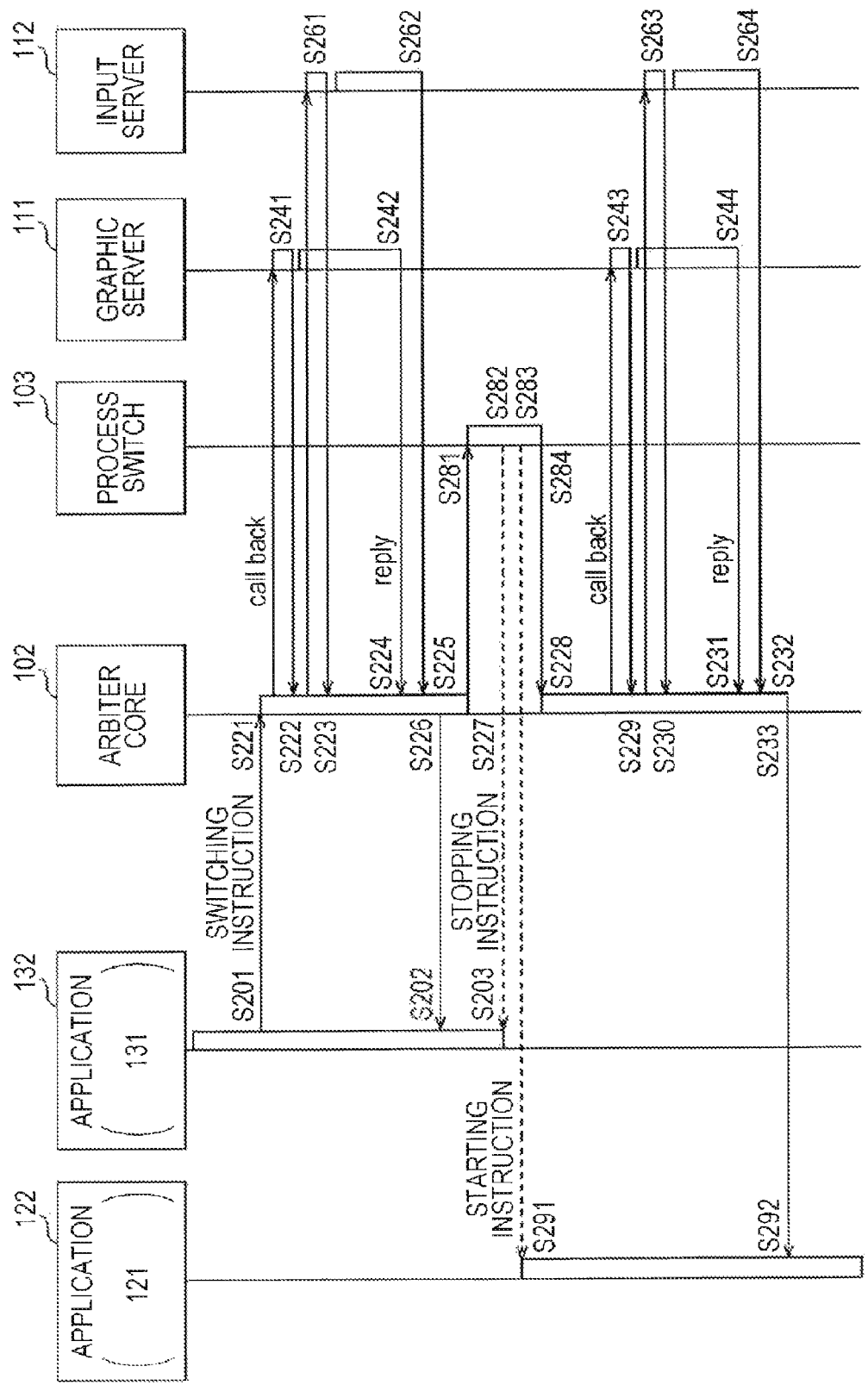
FIG. 11 is a diagram illustrating the switching of application frameworks, in accordance with embodiments.

With reference to FIG. 11, the switching of application frameworks in accordance with embodiments will be described. Herein, a case where the application framework 131 and the application 132 are activated and the switching to the application framework 121 is performed will be exemplified and described.

In Step S201, a request for switching to the application framework 121 is forwarded from the application 132 to the arbiter core 102. The arbiter core 102, which receives the request in Step S221, performs a callback process with the graphic server 111 in Step S222. The graphic server 111 performs a callback process with the arbiter core 102 as a process in Step S241.

In a similar way, the arbiter core 102 performs a callback process with the input server 112 in Step S223. The input server 112 performs a callback process with the arbiter core 102 as a process in Step S261.

The callback process performed as described above is a process to release the connection with the application framework 131. When the release of connection is performed as described above, notices indicating that the release of connection is completed are submitted from the graphic server 111 and the input server 112, respectively (Step S242 and Step S262).

When the arbiter core 102 receives the notices from the graphic server 111 and the input server 112 in Step S224 and Step S225, the arbiter core 102 informs the application framework 131 that the connection between a device and the application framework 131 is released, in Step S226. The application framework 131 receives the notice as described above in Step S202 and thus recognizes that the connection with a device server is released.

While the arbiter core 102 submits the above-described notice to the application framework 131, in Step S227, the arbiter core 102 issues an instruction for switching from the application 132 to the application 122, to the process switch 103.

The process switch 103, which receives the instruction from the arbiter core 102 in Step S281, instructs the application 132 to stop operating in Step S282 (i.e., a deactivation process of the application framework 131 is executed).

In addition, in Step S283, the process switch 103 instructs the application 122 to start operating (i.e., an activation process of the application framework 121 is executed). In such a manner, the switching of applications is performed. In this case, the switching from the application 132 to the application 122 is performed.

When the switching of applications is performed by the instruction from the process switch 103 as described above, a notice that the switching of applications is completed is submitted from the process switch 103 to the arbiter core 102 (Step S284). In Step S228, the arbiter core 102 recognizes an application that is operating at that time, in this case, the application 122, by the notice from the process switch 103.

The arbiter core 102 performs a callback process with the graphic server 111 in Step S229, and performs a callback process with the input server 112 in Step S230. The callback processes are a process to respectively couple the application framework 121 and the graphic server 111, and couple the application framework 121 and the input server 112.

When the connection processes as described above are executed, notices indicating that the connection is completed are submitted from the graphic server 111 and the input server 112, respectively (Step S244 and Step S264). When the arbiter core 102 receives the notices from the graphic server 111 and the input server 112 in Step S231 and Step S232, the arbiter core 102 informs the application framework 121 that the connection with a device is completed, in Step S233. In such a manner, the switching of application frameworks is performed.

Figure 12:
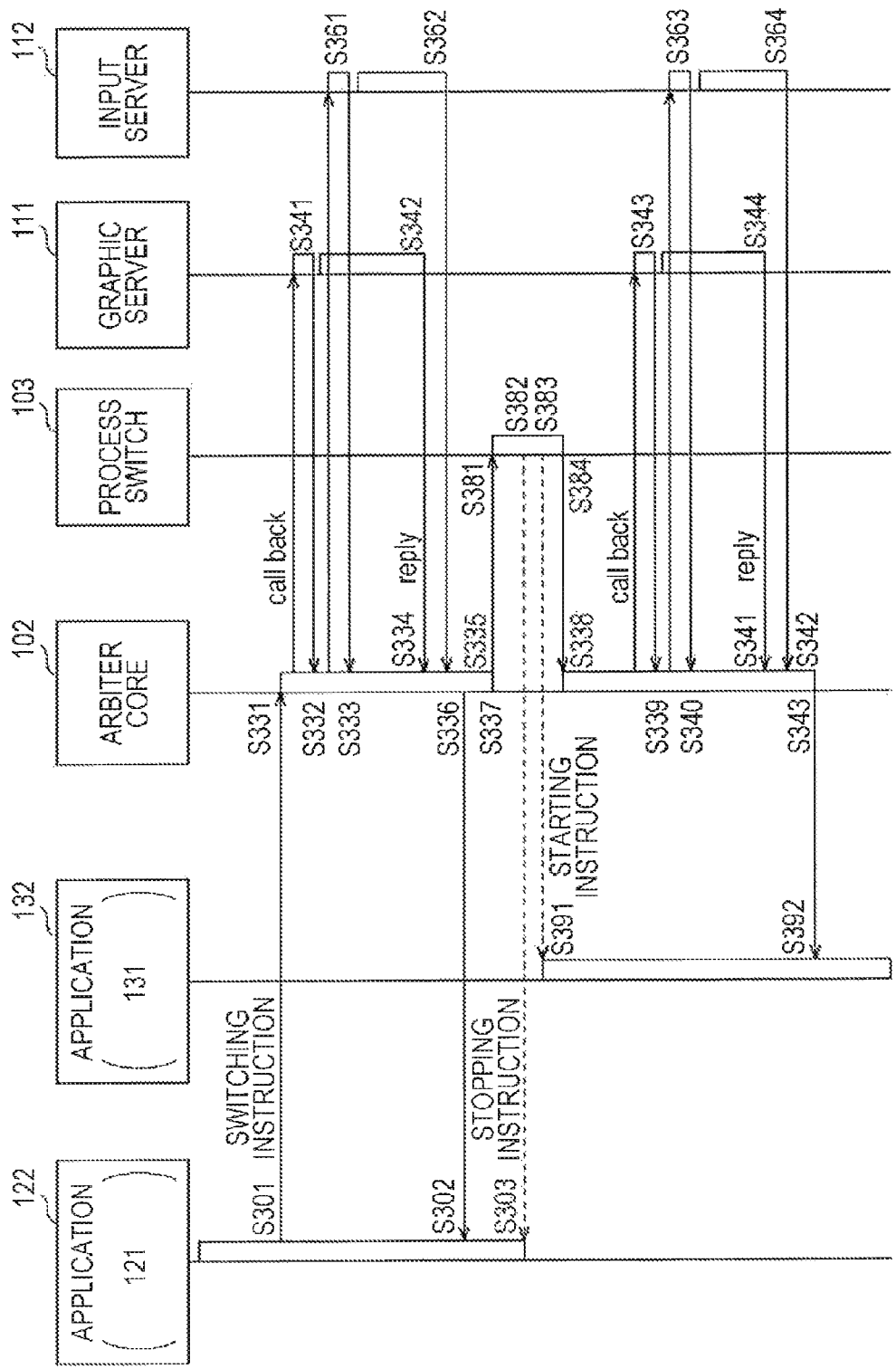
FIG. 12 is a diagram illustrating the switching of application frameworks, in accordance with embodiments.

With reference to FIG. 12, the switching of application frameworks will be described again, in accordance with embodiments. Herein, a case where the application framework 121 and the application 122 are activated and the switching to the application framework 131 is performed will be exemplified and described.

In Step S301, a request for switching to the application framework 131 is forwarded from the application 122 to the arbiter core 102. The arbiter core 102, which receives the request as described above in Step S331, performs a callback process with the graphic server 111 in Step S332. The graphic server 111 performs a callback process with the arbiter core 102 as a process in Step S341.

In a similar way, the arbiter core 102 performs a callback process with the input server 112 in Step S333. The input server 112 performs a callback process with the arbiter core 102 as a process in Step S361.

The callback processes performed as described above are a process to release the connection with the application framework 121. When the release of connection is performed as described above, notices indicating that the release of connection is completed are submitted from the graphic server 111 and the input server 112, respectively (Step S342 and Step S362).

When the arbiter core 102 receives the notices from the graphic server 111 and the input server 112 in Step S334 and Step S335, the arbiter core 102 informs the application framework 121 that the connection with a device is released, in Step S336. While the arbiter core 102 submits the above-described notice, the arbiter core 102 issues an instruction for switching from the application 122 to the application 132, to the process switch 103, in Step S337.

The process switch 103, which receives the instruction from the arbiter core 102 in Step S381, instructs the application 122 to stop operating in Step S382 (i.e., an deactivation process of the application framework 121 is executed).

In addition, in Step S383, the process switch 103 instructs the application 132 to start operating (i.e., an activation process of the application framework 131 is executed). In such a manner, the switching of applications is performed. In this case, the switching from the application 122 to the application 132 is performed.

When the switching of applications is performed by the instruction from the process switch 103 as described above, a notice that the switching of applications is completed is submitted from the process switch 103 to the arbiter core 102 (Step S384). In Step S338, the arbiter core 102 recognizes an application that is operating at that time, in this case, the application 132, by the notice from the process switch 103.

The arbiter core 102 performs a callback process with the graphic server 111 in Step S339, and performs a callback process with the input server 112 in Step S340. The callback processes are a process to respectively couple the application framework 131 and the graphic server 111, and couple the application framework 131 and the input server 112.

When the connection processes as described above are executed, notices indicating that the connection is completed are submitted from the graphic server 111 and the input server 112, respectively (Step S344 and Step S364). When the arbiter core 102 receives the notices from the graphic server 111 and the input server 112 in Step S341 and Step S342, the arbiter core 102 informs the application framework 131 that the connection with a device is completed, in Step S343. In such a manner, the switching of application frameworks is performed.

In such a manner, a plurality of application frameworks may be provided in one system. Therefore, it is possible to switch the plurality of application frameworks. The switching of the plurality of application frameworks may be performed at a high speed, without performing methods such as a method in which once the power of an apparatus is off, and then the power thereof is on again, a method in which a separate processor and hardware are provided to switch the processor and the hardware, or a method in which a virtual machine is used.

Further, in the lifetime of the operating system, it is possible to use an application, which is dependent on various application frameworks, in one system. Moreover, while diversely using an application framework and an application of the past, it is possible to fit an application corresponding to an application framework different from the application framework of the past into a system. This becomes possible and thus it is possible to reduce the developing cost of applications.

<Processes after Switching of Application Frameworks>

Next, processes after application frameworks are switched as described above will be described. First, for the purpose of reference, a case where it is not possible to perform the switching of application frameworks as described above will be described with reference to FIG. 13.

Figure 13:
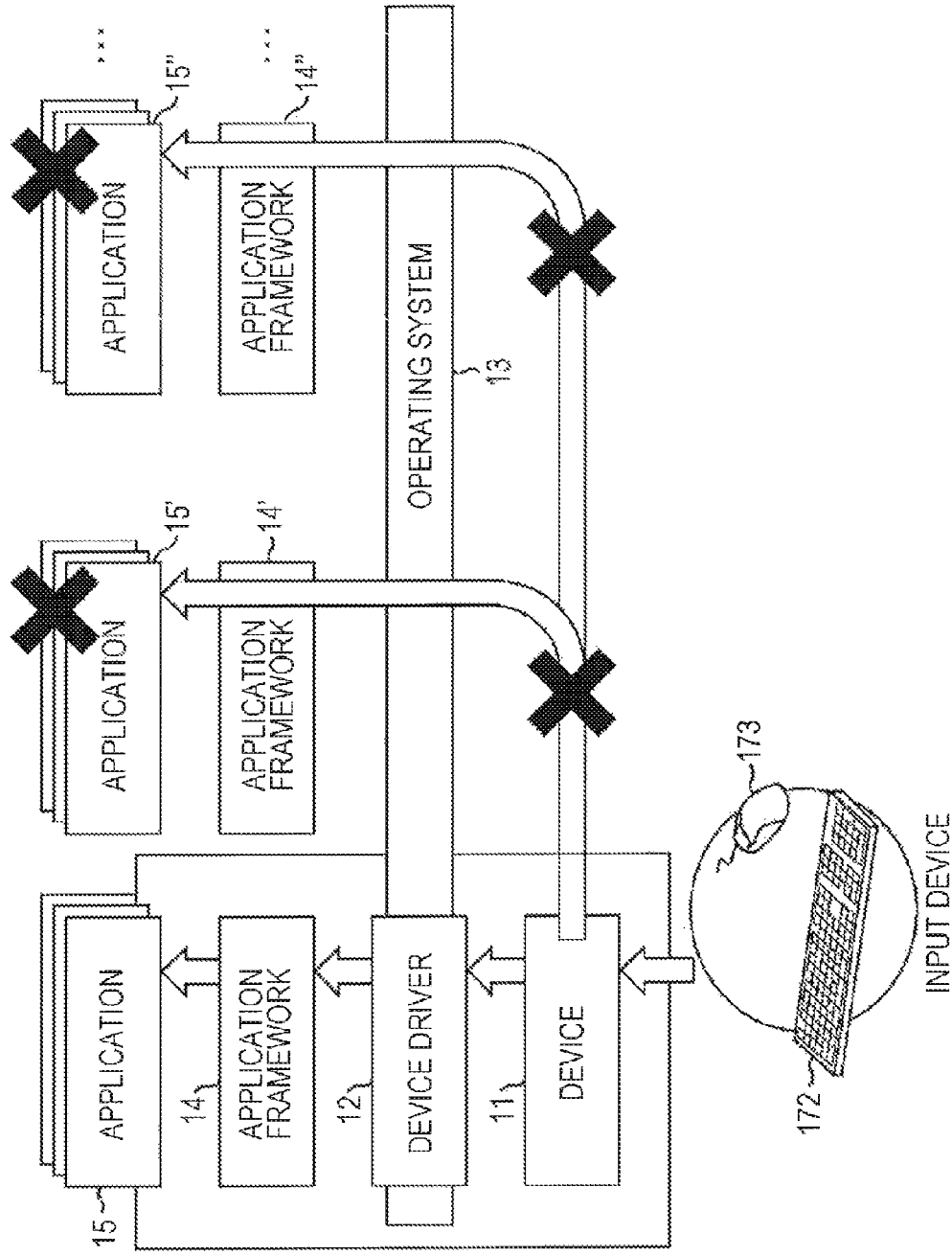
FIG. 13 is a diagram illustrating processes at the time of inputting, in accordance with embodiments.

Referring to FIG. 13, input data from the device 11, such as the keyboard 172 and the mouse 173, as an input device is supplied to the application framework 14 through the device driver 12 on the operating system 13. In addition, the input data is supplied to the application 15 through the application framework 14 and a process corresponding to the input data is executed by the process of the application 15.

As described before with reference to FIG. 2, one system is designed based on the premise that only one application framework 14 is present therein to operate. Therefore, for example, as illustrated in FIG. 13, when an application framework 14' or an application framework 14", which is different from the application framework 14, is present on one system, there is no mechanism that supplies the input data from the device 11 to the application framework 14' or the application framework 14". As a result, it is not possible to supply the input data thereto.

Moreover, an application 15' or an application 15", which is dependent on the application framework 14' or the application framework 14", may not execute the process based on the input data. In other words, only the application 15 on the application framework 14 may use the input data from the input device.

However, as described above, according to embodiments, a plurality of application frameworks are provided in one system and then the plurality of application frameworks may be used by switching the plurality of application frameworks. Processes in accordance with embodiments in which an application framework is switched and then the input data from the input device is transferred to an application will be described below.

Figure 14:
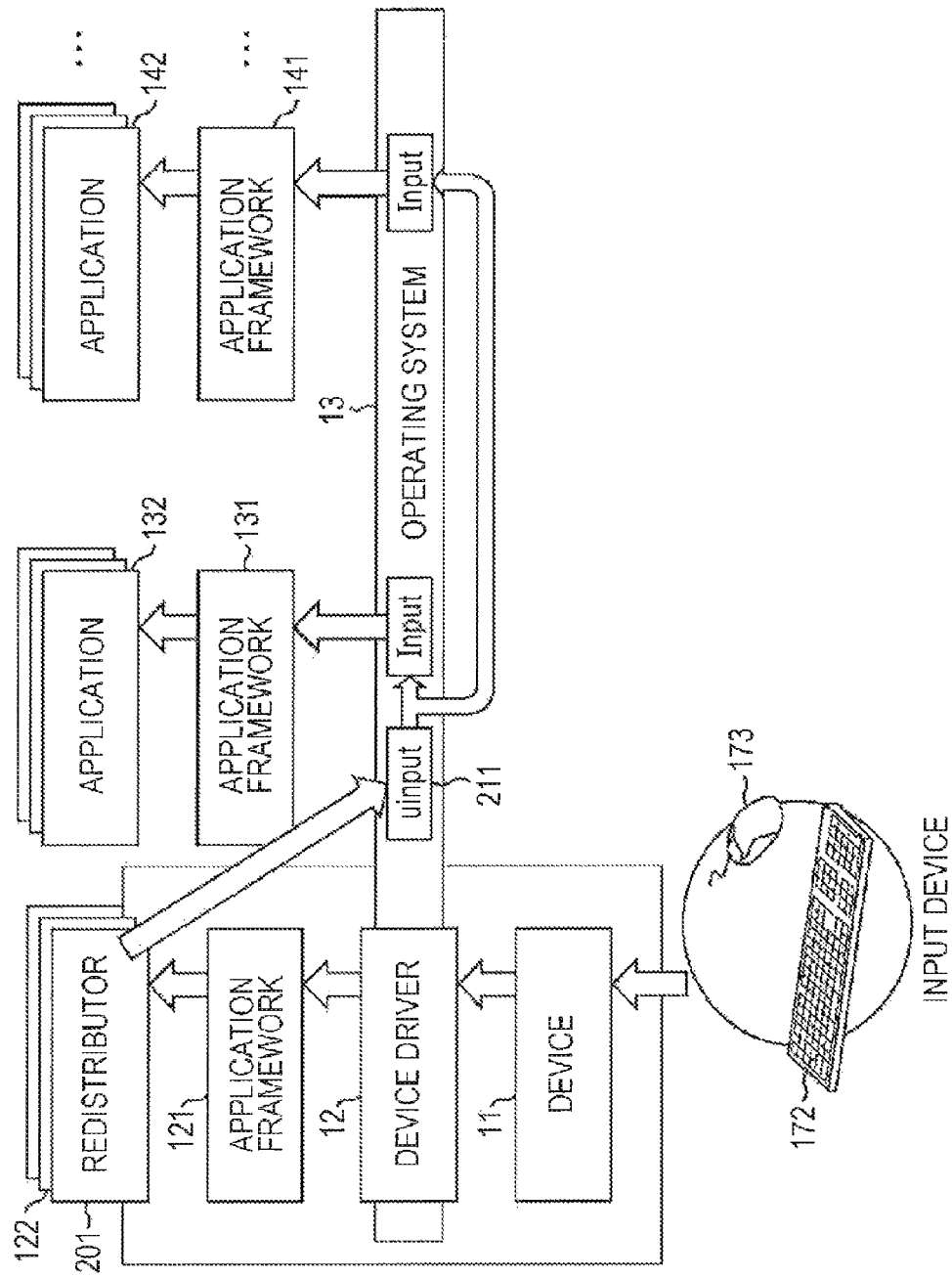
FIG. 14 is a diagram illustrating processes at the time of inputting, in accordance with embodiments.

FIG. 14 is a diagram illustrating a configuration example of a case where an application framework is switched and then the input data from the input device is transferred to an application, in accordance with embodiments. In the example illustrated in FIG. 14, a redistributor 201, which is an application to receive input, may be separately provided with the applications 122-1 to 122-N.

Further, in order to supply the input data from the input device to an application framework in operating among the plurality of application frameworks, the operating system 13, for example, UINPUT function of Linux (registered trademark), may be used. The UINPUT function of the operating system 13 may generate an arbitrary input event, depending on an instruction from an application. That is, the UINPUT function has a function that supplies data, which is inputted by the instruction of the application, to other functions.

By using this function, a module, which performs the process of "when receiving an input event, send the input event to UINPUT", is added as an application on an application framework. This module may be the redistributor 201 as illustrated in FIG. 14. The input event is sent to a uinput 211 by the redistributor 201. Therefore, other application framework 131 and application framework 141 may receive the input event.

As illustrated in FIG. 14, when the application framework 131 is operating, first, input data from the device 11, such as the keyboard 172 and the mouse 173, as an input device is supplied to the application framework 121 through the device driver 12 on the operating system 13. In addition, the input data is supplied to the redistributor 201 through the application framework 121 and is supplied to the uinput 211 of the operating system 13 by the process of the redistributor 201.

The input data is supplied to the application framework 131 by the process of the uinput 211. In such a manner, once the input data is supplied to the redistributor 201, the input data is returned to the uinput 211 of the operating system 13 by the process of the redistributor 201. Thereafter, the input data is supplied to the application framework, which is operating at that time, by the process of the uinput 211.

As described above, the redistributor 201 has a function that supplies the input data from the input device to application frameworks through the operating system 13. This function is similar to the function of the device server 104. For example, as described above with reference to FIG. 5, the device server 104 has an interface function that supplies data from a device to application frameworks.

Accordingly, the configuration illustrated in FIG. 14 may be considered as a case where the device server 104 is provided in the redistributor 201. In this way, the device server 104 may be provided as the redistributor 201. In other words, the device server 104 may be provided as an application. Moreover, it is not necessary to provide the device server 104 completely independent, and the device server 104 may be configured to share other functions.

Figure 15:
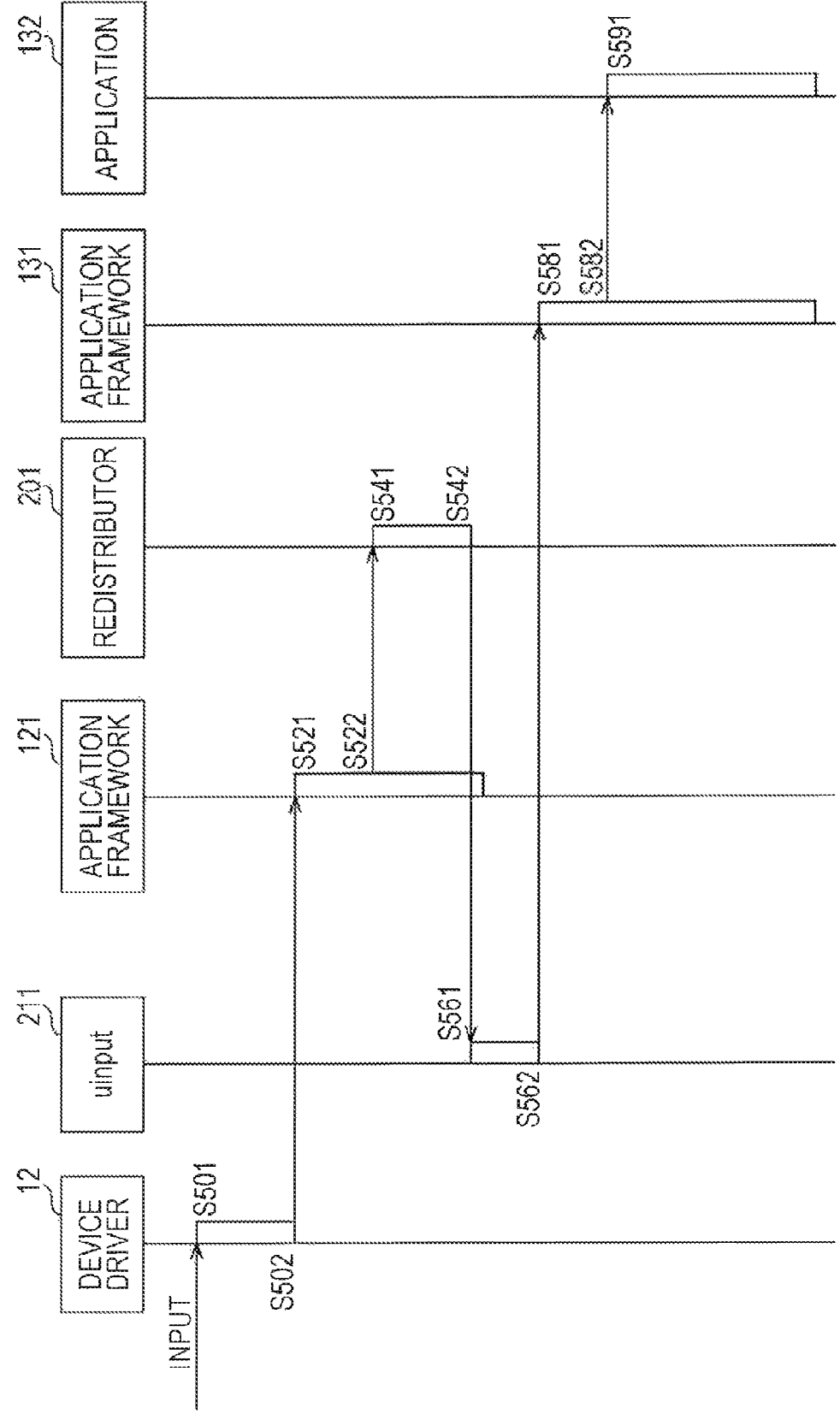
FIG. 15 is a diagram illustrating processes at the time of inputting, in accordance with embodiments.

Processes involved in inputting in the configuration as illustrated in FIG. 14 will be described with reference to a sequence diagram of FIG. 15. In Step S501, the input data from the device 11 is supplied to the device driver 12. The device driver 12 supplies the input data from the device 11 to the application framework 121 (Step S502).

The application framework 121 receives the input data from the device driver 12 in Step S521. As described above, when an input event is generated in the application framework 121, the application framework 121 supplies the input data to the redistributor 201 in Step S522.

As described above, the redistributor 201 is an application that performs the process in which, when the input event is received, the input event is sent to the UINPUT. Therefore, when the redistributor 201 receives the supply of input data from the application framework 121 in Step S541, the redistributor 201 returns the input data to the uinput 211 in Step S542.

When the uinput 211 receives the input data from the redistributor 201 in Step S561, the uinput 211 supplies the input data to the application framework 131 in Step S562. In this case, since the application framework 131 is corresponded to a device by the process of the arbiter core 102, the input data is supplied to the application framework 131. For example, when the application framework 141 is corresponded to a device by the process of the arbiter core 102, the input data is supplied to the application framework 141.

When the application framework 131 receives the input data from the uinput 211 in Step S581, an input event is generated in the application framework 131. When the input event is generated in the application framework 131, the application framework 131 supplies the received input data to the upper level application 132 in Step S582. When the application 132 receives the input data in Step S591, the application 132 starts a process based on this input data.

As described above, the redistributor 201 is provided, the input data is supplied from the redistributor 201 to the uinput 211 and then the input data is allowed to transmit from the uinput 211 to an application framework, which is operating at that time. Therefore, it is possible to supply input from input devices such as a keyboard and a mouse to an application framework, which has been switched.

<Other Processes related to Inputting>

Another configuration example in accordance with embodiments, of a case where input data of an input device is transferred to an application after switching application frameworks will be described with reference to FIG. 16. The example illustrated in FIG. 16 also uses the operating system 13, for example, the UINPUT function of Linux (registered trademark) in order to supply the input data from the input device to an application framework, which is operating, among the plurality of application frameworks in a similar way to the configuration example illustrated in FIG. 14.

Figure 16:
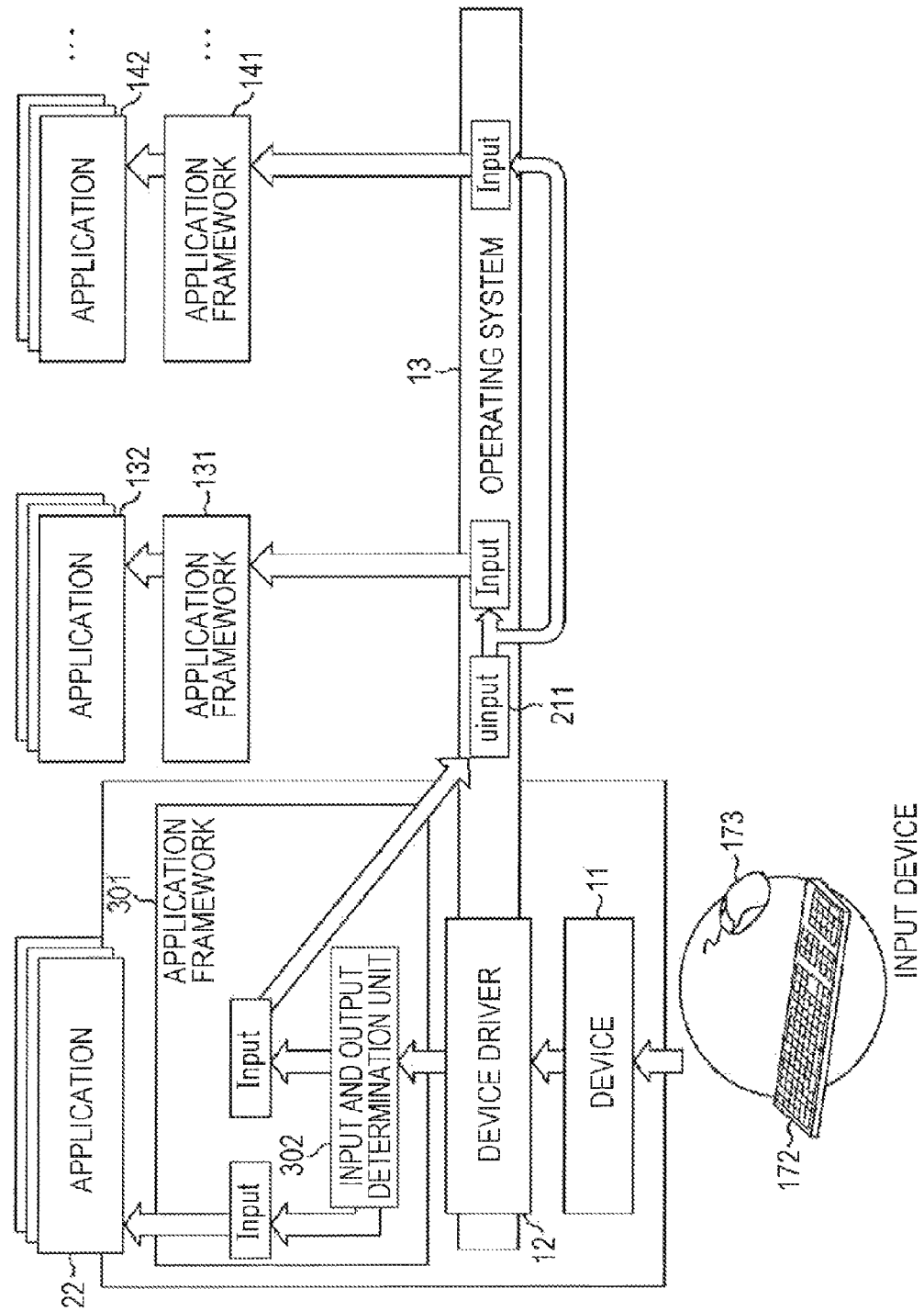
FIG. 16 is a diagram illustrating processes at the time of inputting, in accordance with embodiments.

In the configuration illustrated in FIG. 16, an input and output determination unit 302 is provided in the application framework 301 and the output destination of input data, which is inputted, is determined by the input and output determination unit 302, thereby supplying the input data to the determined destinations. The input and output determination unit 302 determines whether the input data inputted through the device driver 12 is input data to the application 122 or input data to an application other than the application 122. Accordingly, the input data is supplied to an application based on this determination.

In the configuration illustrated in FIG. 16, the input and output determination unit 302, which is provided in the application framework 301, has a function of supplying the input data from the input device to an application framework through the operating system 13 (uinput 211). This function is similar to the function of the device server 104. For example, as described above with reference to FIG. 5, the device server 104 has an interface function of supplying the input data from the device to an application framework.

Accordingly, the configuration illustrated in FIG. 16 is considered as a case where the device server 104 is provided in the application framework 301. As described above, it is possible to provide the device server 104 as one function of an application framework. In other words, it is possible to provide the device server 104 as an application framework. Moreover, it is not necessary to entirely independently provide the device server 104, and the device server 104 may be configured to share other functions.

Figure 17:
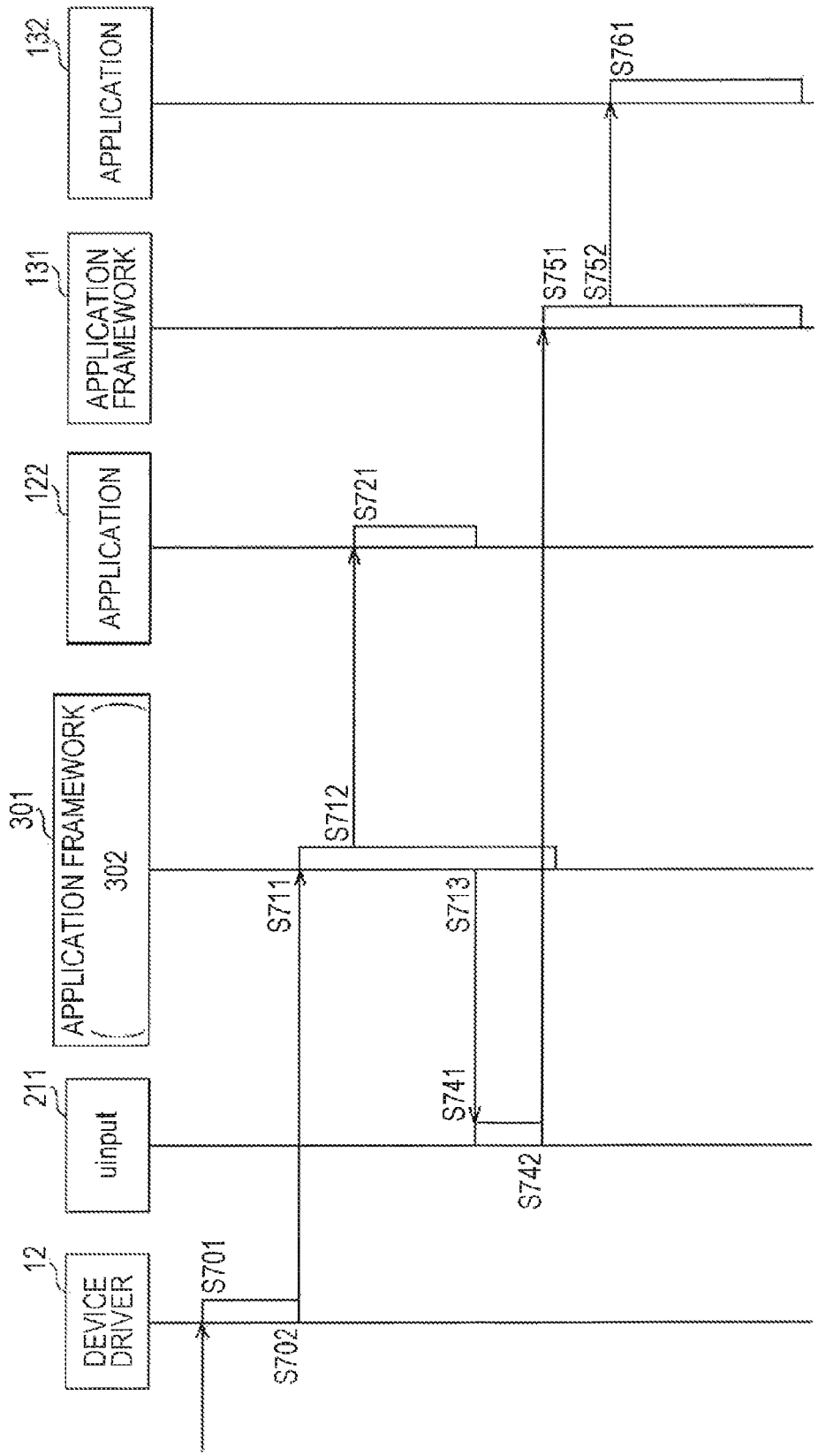
FIG. 17 is a diagram illustrating processes at the time of inputting, in accordance with embodiments.

Processes involved in inputting in accordance with embodiments will be described with reference to a sequence diagram of FIG. 17. When inputting from the device 11 is performed to the device driver 12 in Step S701, the device driver 12 supplies input data to the application framework 301 in Step S702. The input and output determination unit 302 of the application framework 301 determines whether the input data from the device driver 12 is outputted to the application 122 or to an application other than the application 122 in Step S711.

Since the input and output determination unit 302 has a function of the device server 104, the input and output determination unit 302 manages the association between a device and an application framework. The input and output determination unit 302 determines the supply destination of the input data, based on the managed association.

When the input and output determination unit 302 determines that the input data is outputted to the application 122, the input and output determination unit 302 outputs the input data to the application 122 in Step S712. When the application 122 receives the input data from the input and output determination unit 302 in Step S721, the application 122 starts a process based on this input data.

On the other hand, when the input and output determination unit 302 determines that the input data is outputted to an application other than the application 122, the input and output determination unit 302 outputs the input data to the uinput 211 in Step S713. In addition, in FIG. 17, a case where the input data is supplied from input and output determination unit 302 to the application 122 in Step S712 and a case where the input data is supplied from input and output determination unit 302 to the uinput 211 in Step S713 are shown. However, in practice, only one of supplies may be performed based on the determination of the input and output determination unit 302.

When the uinput 211 receives the input data from the input and output determination unit 302 in Step S741, the uinput 211 outputs the input data to the application framework 131, which is operating at that time, in Step S742. As a result, the application framework 131 receives the input data in Step S751.

In this way, when an input event is generated in the application framework 131, the application framework 131 supplies the supplied input data to the upper level application 132 in Step S752. When the application 132 receives the input data from the application framework 131 in Step S761, the application 132 starts a process based on this input data.

In such a manner, it is possible to supply the input data from the input device to a desired application (i.e., application framework).

As described above, it is possible to supply the input data from the input device to a desired application (i.e., application framework). Therefore, even in a case where it is necessary to change the predefined application framework, the change amount thereof is small and then the entire system may be easily extended. In addition, it is possible to perform special processes, such as a process of correcting value or filtering before distributing, or a process of sending input events to a plurality of application framework at the same time, in order to redistribute input events by an application or an application framework. For example, unnecessary events are removed and a pointer coordinate is corrected. Thereafter, it is possible to perform a process of determining an application framework, which distributes an event based on the pointer coordinate, or the like.

<Processes related to Outputting>

Figure 18:
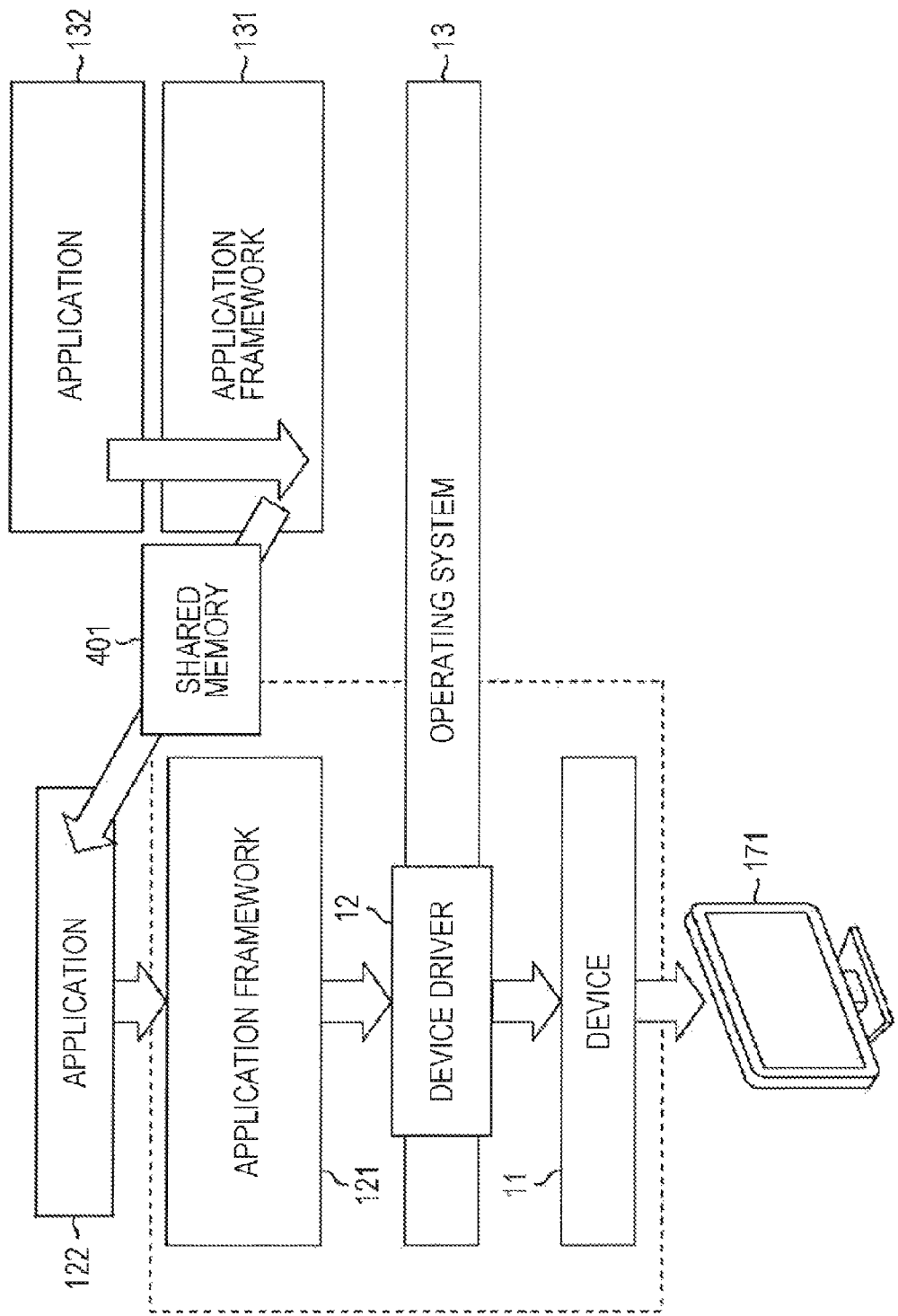
FIG. 18 is a diagram illustrating processes at the time of outputting, in accordance with embodiments.

Next, a case where, after switching application frameworks, data is transferred from a predetermined application to an output device will be described. As illustrated in FIG. 18 and in accordance with embodiments, outputting may be realized by providing a shared memory 401.

The shared memory 401 is a memory which is shared and used in the application 122 and the application framework 131. Moreover, although not shown in FIG. 18, the shared memory 401 is also a memory which may be shared and used in the application 122 and the application framework 141. That is, the shared memory 401 may be a memory which is shared between a predetermined application, in this case, the application 122 on the application framework 121, and a lower level application framework of an application, which is different from the predetermined application.

Data, which the application framework 131 (i.e., the upper level application 132 of the application framework 131) draws, is stored in the shared memory 401 once. Then, the drawing data stored in the shared memory 401 is read by the application 122 and then supplied to the application framework 121.

Thereafter, the drawing data is supplied to the device 11 through the device driver 12 by the application framework 121 to display text or graphics such as an image, which are drawn by the application 132, on the display 171.

Figure 19:
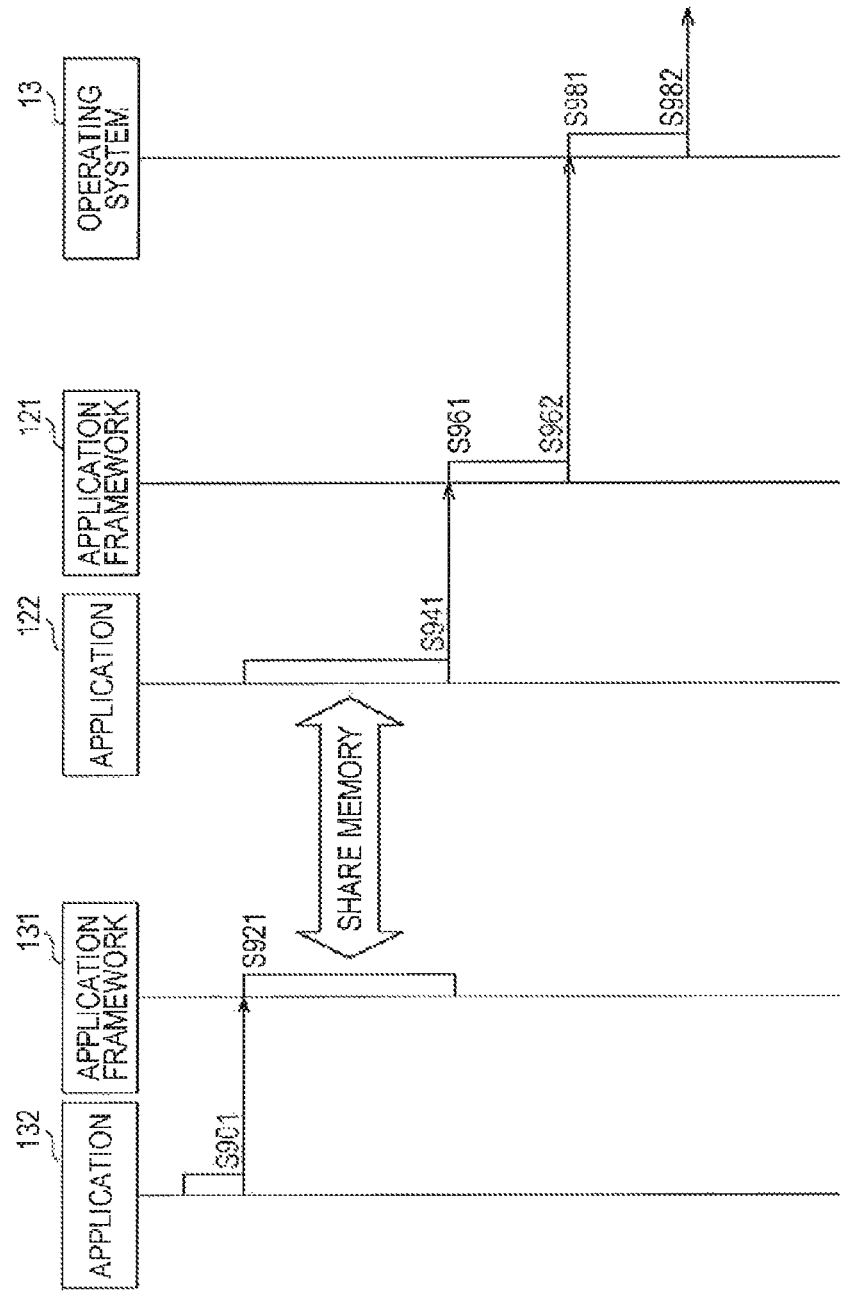
FIG. 19 is a diagram illustrating processes at the time of outputting, in accordance with embodiments.

The processes in accordance with embodiments and as described above will be described with reference to a sequence diagram of FIG. 19. Processes at the time of outputting, which is described with reference to FIG. 19, are similar to the case illustrated in FIG. 18. A case where the application framework 121 occupies a graphic device and graphics drawn by the application 132 are displayed on the display 171 will be exemplified and described.

The application 132 starts drawing in Step S901 to output drawing data to the application framework 131. The application framework 131 writes the received drawing data in the shared memory 401 in Step S921. In this way, the drawing data from the application 132 is written in the shared memory 401.

The application 122 has a function of receiving a notice from the application framework 131 when writing of the drawing data in the shared memory 401 by the application framework 131 is completed, and reading the drawing data written in the shared memory 401.

When the application 122 receives the notice from the application framework 131, the application 122 reads the drawing data from the shared memory 401 in Step S941. The read drawing data is supplied to the application framework 121 by a process of the application 122. When the application framework 121 receives the supply as described above in Step S961, the application framework 121 supplies the drawing data to the operating system 13 (e.g., device driver 12) in Step S962.

Thereafter, the drawing data is supplied from the device driver 12 to the device 11 (e.g., display 171). Therefore, graphics drawn by the application 132 are displayed on the display 171.

As described above, the shared memory 401 is shared and used by the application framework 131 and the application 122. The application 122 reads the drawing data from the shared memory 401 to supply the drawing data to a device. Therefore, drawing is performed. Other outputs, such as audio data, may be also performed through the shared memory 401 in a similar way.

In such a manner, even in the configuration in which a predetermined application framework among the plurality of application frameworks may not directly supply the drawing data to the device 11 (e.g., display 171), the drawing data from the predetermined application framework may be supplied to the device 11 by another application framework and a process of the application on the other application framework. Since it is possible to perform the above-described processes, changing of application frameworks is less and application frameworks are added. Therefore, it is possible to extend the entire system.

<Recording Medium>

The series of processes described above may be executed by hardware or may be executed by software. In a case where the series of processes is executed by software, a program configuring the software is installed on a computer. Here, an example of the computer include a computer, in which dedicated hardware is built-in, a general-purpose personal computer, for example, which is able to execute various functions by installing various programs, and the like.

For example, in the information processing apparatus 10 illustrated in FIG. 1, the series of processes described above is performed by the CPU 21 executing a program stored in the storage unit 28, for example, by loading the program in the RAM 23 via the input and output interface 25 and the internal bus 24.

The program that the computer (e.g., CPU 21) executes is able to be provided, for example, by being recorded on the removable medium 31 as a packaged medium or the like. Further, the program is able to be provided via a wired or wireless transmission medium such as a local area network, the Internet, or a digital satellite broadcast.

In the computer, the program is able to be installed on the storage unit 28 via the input and output interface 25 by fitting the removable medium 31 to the drive 30. Further, the program is able to be installed on the storage unit 28 by being received by the communication unit 29 via a wired or wireless transmission medium. Otherwise, the program may also be installed on the ROM 22 or the storage unit 28 in advance.

Moreover, the program that the computer executes may be a program in which processing is performed in time series along the order described in the present specification, or may be a program in which processing is performed at necessary timings such as in parallel or when a call is made.

Further, in the present specification, a system may denote the entire apparatus formed of a plurality of devices.

Further, in the present disclosure, the terms "connected" and "coupled" may imply that the elements are directly connected or coupled together, or they may be connected or coupled through one or more intervening elements.

Further, the embodiments of the present disclosure are not limited to the embodiments described above, and various modifications are possible without departing from the gist of the present disclosure.

In addition, the present disclosure may also employ the following configurations.

(1) An information processing apparatus including:
a plurality of application frameworks upon which applications are executed; and
a decision unit configured to control a switching of operable states of the plurality of application frameworks.

(2) The information processing apparatus of (1), wherein the decision unit controls the switching of operable states of the plurality of application frameworks based on an instruction from an application executing on a selective one of the plurality of application frameworks.

(3) The information processing apparatus of (2), further including:
a process switching unit configured to switch an active application to the application executing on the selective one of the plurality of application frameworks.

(4) The information processing apparatus of (3), wherein the process switching unit is further configured to stop operation of a currently activated application and start operation of the application executing on the selective one of the plurality of application frameworks.

(5) The information processing apparatus of (1), wherein the decision unit is further configured to supply an input data to a selective one of the plurality of application frameworks.

(6) The information processing apparatus of (5), wherein the decision unit is further configured to supply the input data to the selective one of the plurality of application frameworks, based on an instruction from an application executing on the selective one of the plurality of application frameworks.

(7) The information processing apparatus of (5), wherein the decision unit includes a redistributor that receives the input data from a first application framework and supplies the input data to the selective one of the plurality of application frameworks.

(8) The information processing apparatus of (5), wherein the decision unit includes a first application framework that receives the input data and selectively supplies the input data to one of a first application and the selective one of the plurality of application frameworks.

(9) The information processing apparatus of (5), wherein the decision unit is further configured to supply the input data to a selected one of a first application framework specialized in a camera function and a second application framework specialized in a communication function.

(10) The information processing apparatus of (9), wherein an image data created by an imaging application executing on the first application framework is supplied to a communication application executing on the second application framework for transmission to a target apparatus through a network.

(11) The information processing apparatus of (2), wherein the decision unit is configured to determine which application framework of the plurality of application frameworks is the selective one, based on an instruction from a currently activated application.

(12) The information processing apparatus of (11), wherein the decision unit controls switching to the selective one of the plurality of application frameworks based on the determination, and switches to an application that operates on the selective one of the plurality of application frameworks.

(13) The information processing apparatus of (11), wherein the decision unit is further configured to instruct a current application framework to pause operation, and instruct the selective one of the plurality of application framework to start operation.

(14) The information processing apparatus of (5), wherein when the decision unit receives an instruction from a first application to switch from a first application framework to the selective one of the plurality of application frameworks, the decision unit switches a connection destination of the input data from the first application framework to the selective one of the plurality of application frameworks.

(15) The information processing apparatus of (2), wherein a desired application operates on the selective one of the plurality of application frameworks, and when the desired application is selected by a user, the decision unit automatically switches an active application framework to the selective one of the plurality of application frameworks.

(16) The information processing apparatus of (2), further including:
a memory configured to store data that is used by at least one of a first application framework and a first application executable on the first application framework, and at least one of the selected one of the plurality of application frameworks and a second application executable on the selected one of the plurality of application frameworks.

(17) An information processing method including:
executing a first application associated with a first application framework;

switching an operating state of a second application framework to become active; and executing a second application associated with the second application framework after the operating state of the second application framework is switched to become active.

(18) The information processing method of (17), further including:

supplying an input data to the second application through the second application framework, after the operating state of the second application framework is switched to become active.

(19) The information processing method of (17), further including:

stopping an operation of the first application when the operating state of the second application framework is switched to become active.

(20) The information processing method of (17), wherein the operating state of the second application framework is switched to become active based on an instruction from the second application.

(21) A non-transitory computer-readable medium embodied with a program, which when executed by a computer, causes the computer to perform a method including:

executing a first application associated with a first application framework;

switching an operating state of a second application framework to become active; and executing a second application associated with the second application framework after the operating state of the second application framework is switched to become active.

(22) An information processing apparatus including a plurality of application frameworks and a switching unit that switches the application frameworks.

(23) The apparatus according to (22), further including a first application framework among the plurality of application frameworks, a first application that operates on the first application framework, a second application framework that is different from the first application framework, and a second application that operates on the second application framework, and wherein the switching unit switches input and output destinations of a device from the first application framework to the second application framework, when switching from the first application to the second application framework is instructed.

(24) The apparatus according to (23), wherein the switching unit performs switching to connect the plurality of application frameworks and the device one-on-one.

(25) The apparatus according to any one of (22) to (24), wherein the switching unit respectively has a portion that carries a function of deactivating a predetermined application among the applications and activating other application, and a portion that carries a function of separating the predetermined application among the plurality of application frameworks from the device and connecting the predetermined application to other application framework.

(26) The apparatus according to any one of (23) to (25), wherein the switching unit deactivates the first application and activates the second application, when the switching from the first application to the second application framework is instructed.

(27) The apparatus according to any one of (23) to (26), wherein the first application is in a plurality, wherein the switching unit is present as one application of a plurality of first applications, and wherein the switching unit as the first application transmits input from the device to the second application framework.

(28) The apparatus according to any one of (23) to (27), wherein the switching unit is present as one function of the first application framework, and wherein the switching unit that is included in the first application framework transmits input from the device to the second application framework.

(29) The apparatus according to any one of (23) to (28), wherein input from the device is supplied from the first application or the first application framework to the second application framework, by an input supplying function included in an operating system.

(30) The apparatus according to (29), wherein the input supplying function is a function of uinput.

(31) The apparatus according to any one of (23) to (30), wherein output data from the second application is stored in a storage unit through the second application framework, and wherein the output data stored in the storage unit is read by the first application and then supplied to the device through the first application framework.

(32) The apparatus according to (31), wherein drawing data, which the second application draws, is stored in the storage unit through the second application, and wherein the drawing data stored in the storage unit is read by the first application and then supplied to a display through the first application framework.

(33) The apparatus according to any one of (23) to (32), wherein the first application framework is an application framework related to a camera function, and wherein the second application framework is an application framework related to a communication function.

(34) The apparatus according to (33), wherein an image, which is captured according to an input operation from a user by a process of the first application operating on the first application framework related to the camera function, is sent to other device by a process of the second application operating on the second application framework related to the communication function.

(35) An information processing method of an information processing apparatus, which includes a plurality of application frameworks, including switching the application frameworks.

(36) A program causing a computer, which controls an information processing apparatus including a plurality of application frameworks, to execute a process of switching the application frameworks.

REFERENCE SIGNS LIST

101 Arbiter
102 Arbiter core
103 Process switch
104 Device server
111 Graphic server
112 Input server
113 Sound server
121 Application framework
122 Application
131 Application framework
132 Application
141 Application framework
142 Application

The invention claimed is:
1. An information processing apparatus comprising:
a memory having installed thereon a plurality of applications and application frameworks with different functions upon which the applications are executed, wherein each application requires a respective frame- work with a desired function, and only one application framework can be active at a time; and a processor configured to:
  execute, among the plurality of applications, a first application associated with a first application framework of the plurality of application frameworks;
  receive from the first application a request to switch to a second application and its respective second application framework, wherein switching comprises:
    stopping the first application and deactivating the operating state of the first application framework; and
    switching the operating state of the second application framework by making it active and starting the second application on the second application framework;
  wherein prior to switching:
    receive input data from an input device at the first application executing on the first application framework through a device driver of the operating system; and
    supply the input data to a redistributor through the first application framework, wherein the redistributor uses a module in the operating system to send the input data through the second application framework and to the second application associated with the second application framework; and
  after the switch is performed, execute the second application framework and the second application according to the received input data.

2. The information processing apparatus of claim 1, wherein the processor controls the switching of operable states of the plurality of application frameworks based on an instruction from an application executing on a selective one of the plurality of application frameworks.

3. The information processing apparatus of claim 2, wherein the processor is further configured to:
  switch an active application to the application executing on the selective one of the plurality of application frameworks.

4. The information processing apparatus of claim 3, wherein the processor is further configured to stop operation of a currently activated application and start operation of the application executing on the selective one of the plurality of application frameworks.

5. The information processing apparatus of claim 2, wherein the processor is further configured to determine which application framework of the plurality of application frameworks is the selective one, based on an instruction from a currently activated application.

6. The information processing apparatus of claim 5, wherein the processor controls switching to the selective one of the plurality of application frameworks based on the determination, and switches to an application that operates on the selective one of the plurality of application frameworks.

7. The information processing apparatus of claim 5, wherein the processor is further configured to instruct a current application framework to pause operation, and instruct the selective one of the plurality of application frameworks to start operation.

8. The information processing apparatus of claim 2, wherein a desired application operates on the selective one of the plurality of application frameworks, and when the desired application is selected by a user, the processor automatically switches an active application framework to the selective one of the plurality of application frameworks.

9. The information processing apparatus of claim 2, wherein the memory is a non-transitory computer-readable medium configured to store data that is used by at least one of the first application framework and the first application executable on the first application framework, and at least one of the selected one of the plurality of application frameworks and the second application executable on the selected one of the plurality of application frameworks.

10. The information processing apparatus of claim 1, wherein the processor is further configured to supply an input data to a selective one of the plurality of application frameworks.

11. The information processing apparatus of claim 10, wherein the processor is further configured to supply the input data to the selective one of the plurality of application frameworks, based on an instruction from an application executing on the selective one of the plurality of application frameworks.

12. The information processing apparatus of claim 10, further comprising the redistributor that receives the input data from the first application framework and supplies the input data to the selective one of the plurality of application frameworks.

13. The information processing apparatus of claim 10, wherein the first application framework receives the input data and selectively supplies the input data to one of the first application and the selective one of the plurality of application frameworks.

14. The information processing apparatus of claim 10, wherein the processor is further configured to supply the input data to a selected one of the first application framework specialized in a camera function and the second application framework specialized in a communication function.

15. The information processing apparatus of claim 14, wherein an image data created by an imaging application executing on the first application framework is supplied to a communication application executing on the second application framework for transmission to a target apparatus through a network.

16. The information processing apparatus of claim 10, wherein when the processor receives an instruction from the first application to switch from the first application framework to the selective one of the plurality of application frameworks, the processor switches a connection destination of the input data from the first application framework to the selective one of the plurality of application frameworks.

17. The information processing apparatus of claim 1, wherein the first application framework and the second application framework are different application frameworks having different functions.

18. An information processing method, executed via an information processing apparatus, the method comprising:
  providing a plurality of applications and application frameworks with different functions upon which the applications are executed, wherein each application requires a respective framework with a desired function, the plurality of applications and application frameworks are already installed on a memory storage of the information process apparatus, and only one application framework can be active at a time;
  executing, among the plurality of applications, a first application associated with a first application framework of the plurality of application frameworks;
  receiving from the first application a request to switch to a second application and its respective second application framework, wherein switching comprises:

stopping the first application and deactivating the operating state of the first application framework; and switching the operating state of the second application framework by making it active and starting the second application on the second application framework;

wherein prior to switching:

receiving input data from an input device at the first application executing on the first application framework through a device driver of the operating system; and supplying the input data to a redistributor through the first application framework, wherein the redistributor uses a module in the operating system to send the input data through the second application framework and to the second application associated with the second application framework; and after the switch is performed, executing the second application framework and the second application according to the received input data.

19. The information processing method of claim 18, further comprising:

supplying an input data to the second application through the second application framework, after the operating state of the second application framework is switched to become active.

20. The information processing method of claim 18, further comprising:

stopping an operation of the first application when the operating state of the second application framework is switched to become active.

21. The information processing method of claim 18, wherein the operating state of the second application framework is switched to become active based on an instruction from the second application.

22. A non-transitory computer-readable medium, having installed thereon a plurality of applications and application frameworks with different functions upon which the applications are executed wherein each application requires a respective framework with a desired function and only one application framework can be active at a time, the non-transitory computer-readable medium further embodied with a program, which when executed by a computer, causes the computer to perform a method comprising:

executing, among the plurality of applications, a first application associated with a first application framework of the plurality of application frameworks;

receiving from the first application a request to switch to a second application and its respective second application framework, wherein switching comprises:

stopping the first application and deactivating the operating state of the first application framework; and switching the operating state of the second application framework by making it active and starting the second application on the second application framework;

wherein prior to switching:

receiving input data from an input device at the first application executing on the first application framework through a device driver of the operating system; and supplying the input data to a redistributor through the first application framework, wherein the redistributor uses a module in the operating system to send the input data through the second application framework and to the second application associated with the second application framework; and after the switch is performed, executing the second application framework and the second application according to the received input data.

\* \* \* \* \*